US010611917B2

(12) United States Patent
Buri et al.

(10) Patent No.: US 10,611,917 B2
(45) Date of Patent: Apr. 7, 2020

(54) INSTALLATION FOR THE PURIFICATION OF MINERALS, PIGMENTS AND/OR FILLERS AND/OR THE PREPARATION OF PRECIPITATED EARTH ALKALI CARBONATE

(71) Applicant: Omya International AG, Oftringen (CH)

(72) Inventors: Matthias Buri, Rothrist (CH); Samuel Rentsch, Aarburg (CH); Patrick A. C. Gane, Rothrist (CH); René Vinzenz Blum, St. Urban (CH)

(73) Assignee: Omya International AG, Oftringen (CH)

( * ) Notice: Subject to any disclaimer, the term of this patent is extended or adjusted under 35 U.S.C. 154(b) by 213 days.

(21) Appl. No.: 15/683,958

(22) Filed: Aug. 23, 2017

(65) Prior Publication Data

US 2017/0349759 A1    Dec. 7, 2017

Related U.S. Application Data

(63) Continuation of application No. 14/370,340, filed as application No. PCT/EP2013/051331 on Jan. 24, 2013, now Pat. No. 10,053,582.

(Continued)

(30) Foreign Application Priority Data

Feb. 3, 2012    (EP) .................................... 12153877

(51) Int. Cl.
*C09C 3/04*    (2006.01)
*C09C 1/02*    (2006.01)
*C22B 26/20*    (2006.01)

(52) U.S. Cl.
CPC ................ *C09C 3/041* (2013.01); *C09C 1/02* (2013.01); *C09C 1/021* (2013.01); *C22B 26/20* (2013.01);

(Continued)

(58) Field of Classification Search
CPC ....................................................... C22B 26/20
See application file for complete search history.

(56) References Cited

U.S. PATENT DOCUMENTS 4,615,868 A    10/1986    Wong et al.
4,927,607 A    5/1990    Berg et al.
(Continued)

FOREIGN PATENT DOCUMENTS

CN    1049642 A    3/1991
CN    1189458 A    8/1998
(Continued)

OTHER PUBLICATIONS

Office Action dated Oct. 30, 2014 for AU Application No. 2013214433.
(Continued)

*Primary Examiner* — Melissa S Swain
(74) *Attorney, Agent, or Firm* — Fay Sharpe LLP

(57) ABSTRACT

The present invention relates to an installation for the purification of minerals, pigments and/or fillers and/or the preparation of precipitated earth alkali carbonate and/or mineralization of water and to the use of such an installation for the purification of minerals, pigments and/or fillers and/or mineralization of water and/or the preparation of precipitated earth alkali carbonate.

29 Claims, 4 Drawing Sheets

Related U.S. Application Data

Figure 1:
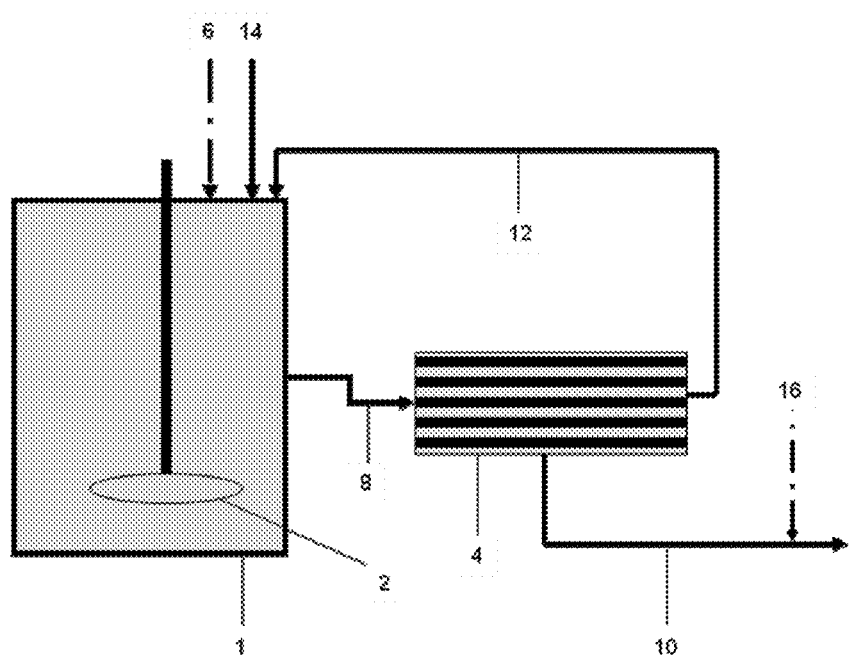

(60) Provisional application No. 61/597,201, filed on Feb. 10, 2012.

(52) U.S. Cl.
CPC ...... *C01P 2004/61* (2013.01); *C01P 2004/62* (2013.01); *C01P 2006/12* (2013.01); *C01P 2006/80* (2013.01); *Y02W 10/37* (2015.05)

(56) References Cited

U.S. PATENT DOCUMENTS

| | | | | |
|---|---|---|---|---|
| 5,084,092 A | * | 1/1992 | Campbell | ............... C22B 7/009 502/22 |
| 2007/0072959 A1 | | 3/2007 | Nip | |
| 2009/0050564 A1 | | 2/2009 | Hatanaka | |
| 2010/0187174 A1 | | 7/2010 | Wursche et al. | |

FOREIGN PATENT DOCUMENTS

| | | | |
|---|---|---|---|
| CN | 1814669 | A | 8/2006 |
| CN | 101255288 | A | 9/2008 |
| CN | 102268142 | A | 12/2011 |
| EP | 0386868 | A1 | 9/1990 |
| EP | 1764346 | A1 | 3/2007 |
| EP | 2447213 | A1 | 5/2012 |
| FR | 1068403 | A | 6/1954 |
| JP | 624494 | A | 1/1987 |
| JP | 2006327914 | A | 12/2006 |
| JP | 2008230898 | A | 10/2008 |
| JP | 2009119461 | A1 | 6/2009 |
| JP | 2010228988 | A1 | 10/2010 |
| WO | 201255750 | A1 | 5/2012 |

OTHER PUBLICATIONS

Office Action dated Dec. 19, 2016 for GC Application No. 2013-23481.
Office Action dated May 30, 2015 for SG Application No. 11201404551R.
Office Action dated Mar. 13, 2016 for SG Application No. 11201404551R.
Office Action dated Dec. 7, 2015 for CA Application No. 2,862,090.
Office Action dated Nov. 24, 2015 for JP Application No. 2014-555151.
Office Action dated Aug. 16, 2016 for JP Application No. 2014-555151.
Office Action dated Oct. 14, 2015 for KR Application No. 10-2014-7021036.
Office Action dated Apr. 7, 2014 for EP Application No. 12153877.1.
International Search Report dated Dec. 4, 2013 for PCT/EP2013/051331.
Written Opinion of the International Searching Authority dated Dec. 4, 2013 for PCT/EP2013/051331.

* cited by examiner

INSTALLATION FOR THE PURIFICATION OF MINERALS, PIGMENTS AND/OR FILLERS AND/OR THE PREPARATION OF PRECIPITATED EARTH ALKALI CARBONATE

CROSS-REFERENCE TO RELATED APPLICATIONS

This is a continuation of U.S. application Ser. No. 14/370,340, filed Jul. 2, 2014, which is the U.S. National phase of PCT Application No. PCT/EP2013/051331, filed Jan. 24, 2013, which claims priority to European Application No. EP12153877.1, filed Feb. 3, 2012 and U.S. Provisional Application No. 61/597,201, filed May 18, 2012, the contents of which are hereby incorporated by reference.

The present invention relates to an installation for the purification of minerals, pigments and/or fillers and/or the preparation of precipitated earth alkali carbonate and/or mineralization of water and to the use of such an installation for the purification of minerals, pigments and/or fillers and/or mineralization of water and/or the preparation of precipitated earth alkali carbonate.

Pure minerals, pigments and/or fillers are used extensively in paper, paper coatings, plastics and paints but also in the food and feed industry, water mineralization and pharmaceutical industry. For example, calcium carbonate, a low cost and high brightness filler, is widely used to increase sheet brightness and opacity in paper products. Its use has increased dramatically in the last decades due to the conversion from acid to alkaline papermaking at paper mills. Both natural and synthetic calcium carbonates are used in the paper industry. For instance, natural calcium carbonate, such as marble, chalk and limestone, is ground to a small particle size prior to its use in paper products, while synthetic calcium carbonate is manufactured by a precipitation reaction and is therefore called precipitated calcium carbonate.

Besides its use in the papermaking industry, natural and synthetic calcium carbonate are also used for various other purposes, e.g. as filler or pigment in paint industries, and as functional filler for the manufacture of plastic materials, plastisols, sealing compounds, printing inks, rubber, toothpaste, cosmetics, food, pharmaceuticals etc. In addition thereto, calcium carbonate can also be used for the treatment and mineralization of water.

Due to the foregoing comments, the industry has a strong demand for efficient and economic devices and systems to prepare pure minerals, pigments and/or fillers. The term "pure" minerals, pigments and/or fillers especially refers to the corresponding mineral, pigment and/or filler phase being free of chemical additives or unwanted impurities which are limiting the use in many applications due to the low brightness of colored impurities. Such impurities are derived from silicates and/or process additives such as fatty amines or quaternary ammonium compound used in flotation.

In this regard, the applicant is aware of several installations for the purification of minerals, pigments and/or fillers. For example, reference is made to installations used for froth flotation processes e.g. as described in the book "FROTH FLOTATION", A Century of Innovation by Maurice C. Fuerstenau, published by Society for Mining, Littleton, Corado, USA, 2007, on pages 635 to 757.

However, the described installations and processes have the disadvantage that specific additives such as collectors, frothers or depressants are required which again contaminate the obtained mineral, pigment and/or filler phase. Such impurities typically prohibit the use of such obtained mineral, pigment and/or filler phase for example as nutrients in food and feed or, alternatively, require an additional cost and time consuming cleaning step.

It should be further noted that the efficiency of said installations and processes rapidly decreases with increasing fineness of the respective impurity particles in the mineral, pigment and/or filler phase such that the extraction of a specific part of minerals out of a blend of minerals, e.g. calcium carbonate out of a blend of impure marble, is more complicated. In particular, the selectivity of said installations and processes decreases because the separation of different mineral phases from each other strongly depends on the degree of particle intergrowths in the mineral, pigment and/or filler phase. The term "degree of particle intergrowth" (particle size of liberation) in the meaning of the present application refers to the size of particles where the different mineral, pigment and/or filler phases are separated from each other.

Also physical separation devices are known in the art. However, e.g. optical sorting has also the disadvantage of limited selectivity due to the degree of particle intergrowths and, furthermore, that sufficient colour contrasts of the particles to be separated is required. Other physical separation devices include X-ray sorting, electrical sorting, screening and/or filtration facing the same problems.

In this regard, one typical prior art installation is shown in the schematic diagram according to FIG. 1. The exemplified installation comprises a mixing unit (1) such as a tank equipped with a stirrer, one inlet for the introduction of water (14), one gas inlet (not shown), e.g. a $CO_2$ inlet, and a further inlet for the introduction of minerals, pigments and/or fillers to be purified (6) which are preferably provided in form of a suspension. The mixing unit further comprises one inlet and one outlet independently connected to a filtration unit (4). Accordingly, also the filtration unit (4) comprises one inlet and one outlet independently connected to the mixing unit (1). In other words, the filtration unit (4) and the mixing unit (1) are provided in a circular arrangement, i.e. both units are in a fluid communication with each other. Furthermore, the filtration unit (4) is equipped with an additional outlet (not shown) for discharging of the filtrate (10) obtained by the filtration process. The discharged filtrate (10) may be subjected to further treatments (16) such as physical and/or chemical treatments and/or the addition of additives. In contrast, the filtrand or retentate obtained in the membrane filtration unit (4) is circulated back into the mixing unit (1).

Herein, the minerals, pigments and/or fillers to be purified could, however, not or only very ineffectively be cleaned up to now. In particular, particle intergrowths in the mineral, pigment and/or filler phase limit the selectivity and, thus, the purification efficiency of the described installation. Therefore, for the purification of minerals, pigments and/or fillers only particulate materials having a particular fineness could be used as starting materials which, however, are available only to a limited extend.

Again, the foregoing physical separation devices have the limitation that their efficiency strongly depends on the degree of particle intergrowth in the mineral, pigment and/or filler phase. Thus, the selectivity of said devices also decreases with an increasing degree of intergrowth of particles.

Furthermore, the expert also faces disadvantages if the particle intergrown in the mineral, pigment and/or filler phase are divided at once and/or below their degree of particle intergrowth as the resulting particles in the mineral, pigment and/or filler phase are ultrafine. In particular, a sudden particle separation may lead to selectivity problems in e.g. a flotation process because the mineral slime may feature a decreased settling behavior. As a consequence, this may lead to uncontrolled overflow of the fines with the froth concentrate. In this regard, a mineral recovery of only 50 wt.-% or even less is frequently observed. The foregoing is well known in the industry today and has to be overcome by a process step called "de-sliming" of the corresponding suspension. De-sliming of a suspension means that the ultrafine part of particles in the suspension is mechanically extracted, separated from the whole and discharged. Up to half of the valuable minerals, which are cost and time consuming to extract, end up in the tailing piles. As a result, the recovered concentrate causes high production costs.

For better understanding of the problem of intergrowths in mineral, pigment and/or filler phases, reference is made to Ullmann's Encyclopedia of Industrial Chemistry, Potassium Compounds, Part 4.1. Inter-growth and Degree of Liberation, June 2002, Wiley-VCH Verlag GmbH & Co. KgaA.

Thus, the main disadvantage of the existing devices and installations today is the fact that the selectivity is still very limited. In particular, the degree of particle intergrowths in the mineral, pigment and/or filler phase represents a decisive limiting factor. In addition thereto, the reactivity of solid particles strongly depends on the particle surface chemistry. For instance, the particle surface may be modified if it is exposed to the atmosphere (e.g. air), water or other environmental influences, such as e.g. electro smog, and thus influences the reaction speed, adsorption and/or surface properties of the minerals, pigments and/or fillers. This aspect is especially relevant if, for example, dolomitic minerals are to be used to remineralize desalinated sea water as the reactivity between dolomite and $CO_2$ is rather slow. Corresponding industrial processes known in the art are not able to overcome the problems associated with such modified particle surface.

In addition thereto, the applicant is also aware of devices and installations for the preparation of precipitated earth alkali carbonate such as precipitated calcium carbonate (PCC) which may be obtained by the precipitation of calcium oxide/calcium hydroxide in an aqueous environment by using gaseous $CO_2$. The prior art installation shown in the schematic diagram according to FIG. 1 may be also used for the preparation of precipitated earth alkali carbonate such as precipitated calcium carbonate (PCC). However, said precipitation reactions in such installations are often non-satisfying because encapsulated CaO and $Ca(OH)_2$ or the respective species may be found in the aggregates of produced PCC or precipitated earth alkali carbonate. In particular, the gaseous/solid/liquid interphases obtained during the precipitation process at solids content of e.g. 15 wt.-% and above are difficult to control. In this context, it should be further noted that after precipitation and formation of precipitated earth alkali carbonate like PCC in an aqueous environment such encapsulated alkaline residual species may migrate during storage out of the precipitated earth alkali carbonate aggregates into the aqueous phase which may lead to a pH increase of the suspension in an uncontrolled way even to above a pH of 12. Such pH increase, however, may damage the precipitated earth alkali carbonate suspension performance and may influence later applications, such as in paper coatings and fillings. The precipitation devices and installations known in the art are not able to solve these problems.

In the art, several approaches for solving the foregoing problems are proposed. For instance, EP1764346 A1 describes a device and process for grinding of PCC after precipitation. During this process residual, encapsulated CaO and $Ca(OH)_2$ in the aggregates are released and increase the pH of the resulting suspension. This may not only result again in a reduced performance of the PCC suspension in later applications, such as paper coatings and fillings, but may also damage and dissolve the grinding beads used during the process.

In view of the foregoing, improving the purification of minerals, pigments and/or fillers and/or the preparation of precipitated earth alkali carbonate still remains of interest to the skilled man. It would be especially desirable to provide an alternative and improved system for the purification of minerals, pigments and/or fillers and/or the preparation of precipitated earth alkali carbonate and/or mineralization of water which can be applied in a more efficient, economic and ecologic way and especially provides a sufficient selectivity and/or reactivity for the preparation of pure minerals, pigments and/or fillers and/or precipitated earth alkali carbonate.

The foregoing and other objects are solved by the provision of an installation for the purification of minerals, pigments and/or fillers and/or the preparation of precipitated earth alkali carbonate and/or mineralization of water, the installation comprising in fluid communication
 a) at least one mixing unit provided with at least two inlets and at least one outlet,
 b) at least one dividing unit comprising dividing means, and
 c) at least one membrane filtration unit provided with at least one inlet and at least one outlet,
wherein at least one outlet of the at least one mixing unit is connected to at least one inlet of the at least one membrane filtration unit and at least one outlet of the at least one membrane filtration unit is connected to at least one inlet of the at least one mixing unit.

As used herein, the term "in fluid communication" means that the units and/or devices being part of the inventive installation are coupled with each other such that a flow of fluid such as of a suspension optionally in combination with at least one inverse aerosol (such as a very fine foam) from one unit and/or device of the inventive installation to another unit and/or device of the inventive installation is possible; such flow may be achieved by way of one or more intermediate (and not specifically mentioned or described) components, apparatuses, devices or other articles like tubes, pipes and pumps. The term "inverse aerosol" is to be interpreted broadly and means any gas suspended in a liquid, for example very small $CO_2$ gas bubbles in water.

The term "purification" is to be interpreted broadly and means any removal of compounds not tolerated or wanted in the mineral, pigment and/or filler phase.

The term "mineralization" as used in the present invention refers to the increase of essential mineral ions in water not containing mineral ions at all or in insufficient amount to obtain water that is palatable. A mineralization can be achieved by adding at least calcium carbonate to the water to be treated. Optionally, e.g., for health-related benefits or to ensure the appropriate intake of some other essential mineral ions and trace elements, further substances may be mixed with the calcium carbonate and then added to the water during the remineralization process. According to the national guidelines on human health and drinking water quality, the remineralized product may comprise additional minerals containing magnesium, potassium or sodium, e.g., magnesium carbonate, magnesium sulfate, potassium hydrogen carbonate, sodium hydrogen carbonate or other minerals containing essential trace elements.

"Ground calcium carbonate (GCC)" in the meaning of the present invention is a calcium carbonate obtained from natural sources including marble, chalk or limestone, and processed through a treatment such as grinding, screening and/or fractionizing wet and/or dry, for example, by a cyclone.

"Precipitated earth alkali carbonate" in the meaning of the present invention is a synthesized material, generally obtained by precipitation following the reaction of carbon dioxide and e.g. lime in an aqueous environment or by precipitation of an earth alkali and carbonate source in water or by precipitation of earth alkali and carbonate ions, for example $CaCl_2$ and $Na_2CO_3$, out of suspension. For example, precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

The inventors of the present invention surprisingly found out that such an installation enables the skilled person to prepare minerals, pigments and/or fillers and/or precipitated earth alkali carbonate with high purity in an efficient, economic and ecologic way. The inventors of the present invention further surprisingly found out that such an installation enables the skilled person to mineralize water with high efficiency in an economic and ecologic way. In particular, this is achieved by providing at least one mixing unit, at least one dividing unit, and at least one membrane filtration unit which are connected in fluid communication. Furthermore, at least one inlet and at least one outlet of the membrane filtration unit are independently connected to the at least one mixing unit.

Thus, the instant installation enables an increase of the overall selectivity of a purification process to be achieved for minerals, pigments and/or fillers installation for the purification of minerals, pigments and/or fillers and/or the preparation of precipitated earth alkali carbonate.

According to another aspect of the present invention, the use of said installation for the purification of minerals, pigments and/or fillers and/or mineralization of water is provided. According to a further aspect of the present invention, the use of said installation for the preparation of precipitated earth alkali carbonate is provided.

Advantageous embodiments of the present invention are defined in the corresponding sub-claims.

When in the following reference is made to preferred embodiments or technical details of the inventive installation, it is to be understood that these preferred embodiments or technical details also refer to the inventive uses of the installation for the purification of minerals, pigments and/or fillers and/or mineralization of water and/or the preparation of precipitated earth alkali carbonate as defined herein and vice versa (as far as applicable). If, for example, it is set out that the at least one mixing unit of the inventive installation comprises a stirring device also the at least one mixing unit of the inventive uses comprises a stirring device.

The present invention will be described with respect to particular embodiments and with reference to certain figures but the invention is not limited thereto but only by the claims. Terms as set forth hereinafter are generally to be understood in their common sense unless indicated otherwise.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to one embodiment of the present invention, the at least one mixing unit comprises a stirring device.

According to another embodiment of the present invention, the at least one mixing unit comprises a heating device capable of heating the content of the at least one mixing unit to a temperature of between 5° C. and 90° C., and preferably between 20° C. and 50° C.

According to yet another embodiment of the present invention, the at least one dividing unit is at least one grinding device and/or at least one crushing device, and preferably is at least one grinding device.

According to one embodiment of the present invention, the at least one dividing unit is at least one vertical grinding device and/or at least one vertical crushing device or at least one horizontal grinding device and/or at least one horizontal crushing device.

According to another embodiment of the present invention, the at least one dividing unit is a conical annular gap bead mill.

According to yet another embodiment of the present invention, the at least one dividing unit comprises dividing means having a weight median particle diameter $d_{50}$ value of from 0.01 mm to 100 mm, preferably from 0.1 mm to 75 mm and most preferably from 0.5 mm to 5 mm.

According to one embodiment of the present invention, the at least one dividing unit comprises moving beads as dividing means made of a material selected from the group comprising quartz sand, glass, porcelain, zirconium oxide, zirconium silicate and mixtures thereof, optionally comprising minor quantities of further minerals.

According to another embodiment of the present invention, the dividing means of the at least one dividing unit are made of a mineral, pigment and/or filler material, preferably the dividing means and the minerals, pigments and/or fillers to be purified and/or to be prepared are of the same material.

According to yet another embodiment of the present invention, the at least one membrane filtration unit is a cross flow membrane filtration device, and preferably is a cross flow membrane microfiltration device and/or a cross flow membrane ultrafiltration device. It is preferred that the cross flow membrane filtration device comprises at least one tube filter membrane having an inner diameter of the tube from 0.01 mm to 25 mm, preferably from 0.1 mm to 10 mm.

According to one embodiment of the present invention, the at least one membrane filtration unit comprises at least one membrane having a pore size of between 0.01 µm and 10 µm, preferably between 0.05 and 5 µm and most preferably between 0.1 and 2 μm. It is preferred that the membrane material is selected from the group comprising a sintered material, porous porcelain, synthetic polymers, like polyethylene, polypropylene or Teflon®, and mixtures thereof.

According to another embodiment of the present invention, the speed of flow across the at least one membrane of the cross flow membrane filtration device is between 0.1 m/s and 10 m/s, preferably between 0.5 m/s and 5 m/s and most preferably between 1 m/s and 4 m/s and/or the pressure at the inlet of the cross flow membrane filtration device is between 0 bar and 30 bar, preferably between 0.2 bar and 10 bar and most preferably between 0.5 and 5 bar.

According to yet another embodiment of the present invention, the installation comprises at least three outlets, preferably at least four outlets and more preferably at least five outlets and/or the installation comprises at least four inlets, preferably at least five inlets and more preferably at least six inlets.

According to one embodiment of the present invention, the at least one mixing unit comprises at least two outlets and/or at least three inlets, preferably at least four inlets.

According to another embodiment of the present invention, at least one inlet provided with the installation is a gas inlet, preferably a $CO_2$ inlet.

According to one embodiment of the present invention, the at least one mixing unit comprises at least two inlets being liquid inlets, preferably at least three liquid inlets, and more preferably at least four liquid inlets.

According to another embodiment of the present invention, the installation comprises at least one control unit regulating the filling level of the at least one mixing unit, pump speed, pH, conductivity, calcium ion concentration (e.g. by ion sensitive electrode) and/or temperature.

According to yet another embodiment of the present invention, the installation comprises at least one pump located between the at least one mixing unit and the at least one membrane filtration unit.

According to one embodiment of the present invention, at least one outlet of the at least one mixing unit is connected to at least one inlet of the at least one dividing unit and at least one outlet of the at least one dividing unit is connected to at least one inlet of the at least one mixing unit.

According to another embodiment of the present invention, the installation further comprises at least one pump located between the at least one mixing unit and the at least one dividing unit.

According to yet another embodiment of the present invention, the pumping capacity of the at least one pump (in $m^3/h$ of the sum) feeding the at least one membrane filtration unit is 0.01 to 100 times the volume of the at least one mixing unit and/or the ratio of the pumping capacity of the at least one pump (in $m^3/h$ of the sum) feeding the at least one dividing unit to the pumping capacity of the at least one pump (in $m^3/h$ of the sum) feeding the at least membrane filtration unit is between 1:1 and 1:1000 and preferably between 1:5 and 1:250.

According to one embodiment of the present invention, the at least one dividing unit is integrated in the at least one mixing unit.

According to another embodiment of the present invention, at least one inlet being a gas inlet is located between the at least one mixing unit and the at least one dividing unit, more preferably between a feed pump of the at least one dividing unit and the at least one dividing unit, and most preferably at the inlet of the dividing unit.

According to yet another embodiment of the present invention, the at least one inlet being a gas inlet is a venturi injector that is located between the at least one mixing unit and the at least one dividing unit. Preferably, the venturi injector is located between the outlet of the at least one mixing unit and the inlet of the at least one dividing unit.

According to one embodiment of the present invention, at least one inlet being a gas inlet is located at the top of the hollow shaft of the stirring device of the at least one mixing unit.

The present invention is now described in more detail:

Thus, the present invention provides an installation for the purification of minerals, pigments and/or fillers and/or mineralization of water and/or the preparation of precipitated calcium carbonate, the installation comprising in fluid communication a) at least one mixing unit provided with at least two inlets and at least one outlet, b) at least one dividing unit comprising dividing means, and c) at least one membrane filtration unit provided with at least one inlet and at least one outlet, wherein at least one outlet of the at least one mixing unit is connected to at least one inlet of the at least one membrane filtration unit and at least one outlet of the at least one membrane filtration unit is connected to at least one inlet of the at least one mixing unit.

The installation of the present invention is applicable to any purification process carried out in a reactor system utilizing minerals, pigments and/or fillers irrespective of the degree of particle intergrowths and/or to the mineralization of water and/or to the preparation of precipitated earth alkali carbonate.

For example, nearly pure precipitated earth alkali carbonate may be prepared in the inventive installation out of an impure material.

The precipitated earth alkali carbonate that may be prepared is preferably selected from among, crystalline calcium carbonate in the calcitic, the aragonitic or the vateritic form, magnesite and hydromagnesite, or is a mixture of the aforementioned.

The purification and preparation of precipitated earth alkali carbonate may preferably be carried out in that water, at least one substance comprising e.g. at least one earth alkali carbonate and optionally at least one earth alkali hydroxide, wherein the at least one substance is preferably provided in dry form or in aqueous suspended form, and $CO_2$ are combined.

The at least one substance comprising at least one earth alkali carbonate and optionally at least one earth alkali hydroxide is preferably selected from natural calcium and/or magnesium carbonate containing inorganic substances or salts, or synthetic calcium and/or magnesium carbonate containing inorganic substances or salts.

For example, the at least one substance comprising at least one earth alkali carbonate and optionally at least one earth alkali hydroxide is preferably selected from the group comprising marble, limestone, chalk, half burnt lime, burnt lime, dolomitic limestone, calcareous dolomite, half burnt dolomite, burnt dolomite, and precipitated earth alkali carbonates such as precipitated earth alkali carbonate, for example of calcitic, aragonitic and/or vateritic mineral crystal structure, for example from water de-hardening by the addition of $Ca(OH)_2$.

Useful natural occurring inorganic substances are for example marble, limestone, chalk, dolomitic marble and/or dolomite. Synthetic substances are for example precipitated calcium carbonates in the calcitic, aragonitic and/or vateritic crystalline form. However, natural occurring inorganic substances such as, for example, marble, limestone, chalk, dolomitic marble and/or dolomite are preferred.

The optional at least one earth alkali hydroxide is preferably calcium hydroxide and/or magnesium hydroxide. Due to the fact of very low solubility of $Mg(OH)_2$ in water compared to $Ca(OH)_2$ the speed of reaction of $Mg(OH)_2$ with $CO_2$ is very limited and in presence of $Ca(OH)_2$ in suspension the reaction of $CO_2$ with $Ca(OH)_2$ is very much preferred. Surprisingly, by using the inventive installation it is possible to produce $Mg(HCO_3)_2$ rich earth alkali hydrogen carbonate suspension also in presence of $Ca(OH)_2$ in the suspension.

The at least one substance comprising at least one earth alkali carbonate and the optional at least one earth alkali hydroxide preferably has a weight median particle size ($d_{50}$) in the range of 0.1 μm to 1 mm, and preferably in the range of 0.2 μm to 100 μm, more preferably in the range of 0.5 to 25 μm, for example 0.7 to 3 μm.

Additionally or alternatively, the at least one substance comprising at least one earth alkali carbonate and the optional at least one earth alkali hydroxide has preferably a specific surface area (SSA) in the range of 0.01 to 200 $m^2/g$, and more preferably in the range of 1 to 100 $m^2/g$, for example 1 to 15 $m^2/g$. For determining the specific surface area, a Mastersizer 2000 device from the company Malvern Instruments GmbH, Germany, was used.

The term "specific surface area (SSA)" in the meaning of the present invention describes the material property of pigments/minerals/solids that measures the surface area per gram of pigments. The unit is $m^2/g$.

The term "total particle surface area ($SSA_{total}$)" in the meaning of the present invention describes the total surface area per tonne of suspension S.

Throughout the present application, the "particle size" of a mineral, pigment and/or filler product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention, the particle size is specified as weight median particle size $d_{50}$ unless indicated otherwise. These values were measured using a Mastersizer 2000 device from the company Malvern Instruments GmbH, Germany.

Furthermore, the at least one substance comprising at least one earth alkali carbonate and the optional at least one earth alkali hydroxide may have a hydrochloric acid (HCl) insoluble content from 0.02 to 90 wt.-%, preferably from 0.05 to 15 wt.-%, based on the total weight of the dry substance. The HCl insoluble content may be, e.g., minerals such as quartz, silicate, mica and/or pyrite.

The water is preferably selected from distilled water, tap water, desalinated water, brine, brackish water, treated wastewater or natural water such as ground water, surface water, sea water or rain water. The water may contain NaCl in an amount between 0 and 200 mg per liter.

Sea water or brackish water may be firstly pumped out of the sea by open ocean intakes or subsurface intakes such as wells, and then it undergoes physical pretreatments such as screening, sedimentation or sand removal process. Additional treatment steps such as coagulation and flocculation may be necessary in order to reduce potential fouling on membranes used in the inventive installation. The pretreated sea water or brackish water may be further distilled, e.g., by using multiple stage flash, multiple effect distillation, or membrane filtration such as ultrafiltration or reverse osmosis, to remove remaining particulates and dissolved substances.

The $CO_2$ is preferably selected from gaseous carbon dioxide, liquid carbon dioxide, solid carbon dioxide or a gaseous mixture of carbon dioxide and at least one other gas, and is preferably gaseous carbon dioxide. When the $CO_2$ is a gaseous mixture of carbon dioxide and at least one other gas, then the gaseous mixture is a carbon dioxide containing flue gas exhausted from industrial processes like combustion processes or calcination processed or alike. $CO_2$ can also be produced by reacting an alkali- and/or earth alkali carbonate with acid. The acid used in the present invention is preferably an inorganic acid such as sulphuric acid, hydrochloric acid, phosphoric acid, and is preferably sulphuric acid or phosphoric acid. Preferably the alkali- and/or earth alkali carbonate to produce the $CO_2$ is a calcium carbonate comprising earth alkali carbonate, more preferably the alkali- and/or earth alkali carbonate is of the same quality as the at least one earth alkali carbonate. If the $CO_2$ is produced by reacting an alkali- and/or earth alkali carbonate with acid, then the acid is preferably dosed directly in the mixing unit (in the case where the dividing unit is integrated in the mixing unit) or in the system after the outlet of the mixing unit and before the inlet of the dividing unit (e.g. for a system shown in FIG. 2) Furthermore, it can be produced by the combustion of organics, such as ethyl alcohol, wood and the like, or by fermentation. When a gaseous mixture of carbon dioxide and at least one other gas is used, then the carbon dioxide is present in the range of 8 to about 99 vol.-%, and preferably in the range of 10 to 98 vol.-%, for example 95 vol.-%. $CO_2$ gas can also contain >99 vol.-%, for example ≥99.9 vol.-%.

Additionally or alternatively, the $CO_2$ preferably has a $^{14}C$ decay of at least 500, more preferably at least 800 and most preferably at least 850 to 890 decays per h and per g of C in the $CO_2$.

In one preferred embodiment of the present invention, the amount of $CO_2$ used, in mol, to produce 1 mol of at least one earth alkali hydrogen carbonate in the aqueous suspension out of calcium carbonate containing material is in the range of only 0.5 to 4 mol, preferably in the range of only 0.5 to 2.5 mol, more preferably in the range of only 0.5 to 1.0 mol, and most preferably in the range of only 0.5 to 0.65 mol.

In particular, the water, the at least one substance comprising at least one earth alkali carbonate and the optional at least one earth alkali hydroxide and the $CO_2$ may be combined in order to obtain a suspension S having a pH of between 6 and 9, wherein the resulting suspension S contains particles. Alternatively, the water and the at least one substance comprising at least one earth carbonate and the optional at least one earth alkali hydroxide are combined in order to obtain an alkaline aqueous suspension of at least one substance comprising at least one earth alkali carbonate and the optional at least one earth alkali hydroxide, and subsequently the alkaline aqueous suspension is combined with the $CO_2$ in order to obtain a suspension S having a pH of between 6 and 9, wherein the suspension S contains particles.

In one preferred embodiment of the present invention, the aqueous suspension of the at least one substance comprising at least one earth alkali carbonate and the optional at least one earth alkali hydroxide in a minor amount in respect to earth alkali carbonate, is freshly prepared by mixing the water and the substance comprising at least one earth alkali carbonate and the optional at least one earth alkali hydroxide in a minor amount in respect to earth alkali carbonate.

The term aqueous "suspension" in the meaning of the present invention comprises essentially insoluble solids and water and optionally further additives and usually contains large amounts of solids and, thus, is more viscous and generally of higher density than the liquid from which it is formed. However, the term "essentially insoluble" does not exclude that at least a part of the solids material dissolves in water under certain conditions, e.g. for water treatment.

The on-site preparation of the aqueous suspension may be preferred since premixing the aqueous suspensions may require the addition of further agents such as stabilizers or disinfectants. If disinfection is needed, preferably an inlet for hydrogen peroxide dosage is needed. If the suspension contains residual NaCl disinfection can be achieved preferably by installing a direct voltage (DC) electrolysis equipment forming traces of $Cl_2$ as disinfectant. In addition, the direct voltage (DC) electrolysis equipment can be connected to and controlled by a $Cl_2$ detector.

Combining and mixing the water and the substance comprising at least one earth alkali carbonate and the optional at least one earth alkali hydroxide such that an aqueous suspension of the at least one substance comprising at least one earth alkali carbonate and the optional at least one earth alkali hydroxide is preferably carried out in the at least one mixing unit provided with at least two inlets and at least one outlet as required for the inventive installation.

In this regard, it is appreciated that the at least one mixing unit may be any kind of tank and/or vessel well known to the man skilled in the art for combining and/or mixing and/or stirring suspensions comprising minerals, pigments and/or fillers.

For example, the at least one mixing unit may be a tank and/or vessel ranging from 10 l to 100,000 kl, preferably from 50 l to 50,000 kl and more preferably from 1,000 l to 25,000 kl.

Additionally or alternatively, the installation of the present invention comprises one mixing unit.

In one preferred embodiment of the present invention, the at least one mixing unit comprises a stirring device. For example, the stirring device is selected from mechanical stirring devices such as a stirring blade typically used for agitating and mixing suspensions comprising minerals, pigments and/or fillers in a tank and/or vessel. Alternatively, the stirring device is selected from powder-liquid mixing devices typically used for agitating and mixing more concentrated suspensions comprising minerals, pigments and/or fillers in a tank and/or vessel.

In one preferred embodiment of the present invention, the stirring device is a mixing machine, wherein the mixing machine enables simultaneous mixing of the aqueous suspension and dosing of gas, e.g. $CO_2$.

In another preferred embodiment of the present invention, the at least on mixing unit may be equipped with a gas inlet which may be located such that the introduction of gas, e.g. $CO_2$, into the at least one mixing unit results in a sufficient agitation of the aqueous suspension. In one preferred embodiment of the present invention, at least one inlet being a gas inlet is located at the top of the hollow shaft of the stirring device of the at least one mixing unit. When the gas inlet is located at the top of the hollow shaft of the stirring device, the gas, e.g. $CO_2$, is introduced into the mixing unit by the vacuum that is caused by the rotation of the stirring blades. However, the gas, e.g. $CO_2$, can also be introduced into the mixing unit through the top of the hollow shaft of the stirring device by applying at least some pressure. It is noted that the preferred embodiment for the introduction of the gas is one where the gas is introduced into the mixing unit by the vacuum that is caused by the rotation of the stirring blades. Furthermore, the at least one mixing unit may comprise agitation means such as agitation beads.

Depending on the concentration of the resulting aqueous suspension S, the mixing time may be from 5 to 600 min, from 10 to 200 min, from 20 to 100 min, or from 30 to 50 min.

The resulting aqueous suspension S has preferably a pH in the range of 6.5 to 9, preferably in the range of 6.7 to 7.9, and most preferably in the range of 6.9 to 7.7, at 20° C.

According to one embodiment of the present invention, the aqueous phase of the resulting aqueous "suspension S" has a calcium ion concentration from 1 to 700 mg/l, preferably from 50 to 650 mg/l, and most preferably from 70 to 630 mg/l. According to another embodiment of the present invention, the aqueous phase of the aqueous "suspension S" comprising at least one earth alkali hydrogen carbonate has a magnesium ion concentration from 1 to 200 mg/l, preferably from 2 to 150 mg/l, and most preferably from 3 to 125 mg/l.

According to one embodiment of the present invention, the resulting aqueous solution after the at least one membrane filtration unit has a calcium concentration from 1 to 700 mg/l, preferably from 50 to 650 mg/l, and most preferably from 70 to 630 mg/l. According to another embodiment of the present invention, the aqueous solution after the at least one membrane filtration unit comprising at least one earth alkali hydrogen carbonate has a magnesium concentration from 1 to 200 mg/l, preferably from 2 to 150 mg/l, and most preferably from 3 to 125 mg/l.

Additionally or alternatively, the resulting aqueous solution after the at least one membrane filtration unit has a turbidity value of lower than 1.0 NTU, preferably of lower than 0.5 NTU, and most preferably of lower than 0.3 NTU.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

In one preferred embodiment of the present invention, the at least one mixing unit comprises a heating device capable of heating the content of the at least one mixing unit to a desired temperature. The content of the at least one mixing unit is typically adjusted with the heating device to a temperature from 5° C. to 90° C. and preferably from 20° C. to 50° C. For example, the content of the at least one mixing unit is adjusted with the heating device to a temperature from 20° C. to 40° C. and preferably from 20° C. to 30° C.

It is appreciated that the heating device may be any kind of heating means known to the man skilled in the art for controlling and adjusting the temperature in a vessel and/or tank.

The aqueous suspension S formed in the at least one mixing unit has solids content in the range from 0.1 to 50 wt.-%, preferably in the range of 3 to 35 wt.-%, more preferably in the range of 5 to 25 wt.-%, based on the total weight of the resulting suspension S. The particles obtained in the resulting suspension S represent a total particle surface area ($SSA_{total}$) that is at least 5 000 $m^2$/tonne of the resulting "suspension S". The suspension S can be prepared in the mixing unit by mixing water, mineral powder and/or a suspension (also called slurry) of calcium carbonate.

At least a part of the resulting suspension S obtained in the at least one mixing unit is filtered by passing at least a part of the resulting suspension S through at least one membrane filtration unit in order to obtain an aqueous solution comprising at least one earth alkali hydrogen carbonate and, furthermore, at least a part of the particles of the resulting suspension S is subjected to a particle dividing step. It has to be noted that at least a part of the filtering of the resulting suspension S takes place parallel to the particle dividing step.

The resulting suspension S may be withdrawn intermittently or continuously from the at least one mixing unit through at least one outlet located at the at least one mixing unit. Intermittent withdrawal may be arranged, for instance, by using periodically opening valves, rotating valves, settling legs and the like. Continuous withdrawal is typically arranged by using a continuously operating control valve. The position of the one or more valves used for intermittent or continuous withdrawal is adjusted such that it is underneath the typical filling height of the resulting suspension in the at least one mixing unit. Preferably, the one or more valves used for intermittent or continuous withdrawal is positioned at the bottom of the at least one mixing unit.

One specific requirement of the present inventive is thus that the installation comprises at least one dividing unit comprising dividing means.

It is appreciated that the at least one dividing unit refers to a device capable of dividing solid particles and gas bubbles such that a reduced size of particles and/or gaseous bubbles in the obtained suspension is observed.

The at least one dividing unit may be any kind of device well known to the man skilled in the art and typically used for dividing and or reducing the particle size of solid particles in suspensions comprising minerals, pigments and/or fillers.

In one preferred embodiment of the present invention, the at least one dividing unit is any kind of grinding device and/or crushing device. In one preferred embodiment of the present invention, the at least one dividing unit is a grinding device. For example, the at least one dividing unit may be any conventional grinding device in which refinement predominantly results from impacts with a secondary body, e.g. a ball mill, a rod mill, a vibrating mill, a centrifugal impact mill, an annular gap bead mill, a vertical bead mill, an attrition mill, or other such equipment known to the skilled person.

In one preferred embodiment of the present invention, the at least one dividing unit is selected from a vertical grinding device and/or vertical crushing device. Alternatively, the at least one dividing unit is a horizontal grinding device and/or horizontal crushing device.

According to yet another embodiment of the present invention, the at least one dividing unit is at least one dividing device capable to reduce both the size of solid particles and that of gaseous bubbles. This embodiment has the advantage that two process steps, i.e. the reduction of the size of the solid particles and the size of the gaseous bubbles, can be carried out in only one component of the installation, in this case the dividing unit. As a consequence, there is no need for two different components to achieve the reduction of the size of the solid particles and the size of the gaseous bubbles, which results in cost and space savings as well as an optimal particle size of both reactants at the same time.

One dividing unit that may be particularly incorporated in the inventive installation is a conical annular gap bead mill. Preferred is a conical annular gap bead mill in which the milling zone is created in the gap between a conical working vessel—the stator—and a conical rotor. The gap is preferably in the range of 4 mm to 25 mm, more preferably in the range of 5 mm to 20 mm and most preferably in the range of 6 mm to 15 mm, in the range of 6.5 mm to 13 mm. The movement of the rotor creates radial movement of the grinding media (metal, glass or ceramic beads). Momentum amplifies the outward motion, so that the product shear force increases steadily during the milling operation. Dividing means such as milling (or grinding) beads are automatically re-introduced into the product flow as it enters the milling chamber, so that continuous circulation of the media in the milling chamber is achieved. The geometry of the grinding chamber ensures uniform particle size and distribution. Product is fed by an external pump with variable flow rate. The peripheral speed of the rotor, the width of the milling gap, the material and diameter of grinding media, media fill volume and flow velocity can be used to influence the result of particle size reduction. Each of these parameters can be varied at will to create the optimum conditions for each product.

Annular gap bead mills are known to the skilled man. One annular gap bead mill that may be suitable for the inventive installation includes the annular gap bead mills available from Romaco FrymaKoruma, Germany as FrymaKoruma CoBall MS12, FrymaKoruma CoBall MS18, FrymaKoruma CoBall MS32 or FrymaKoruma CoBall MS50.

It is appreciated that the at least one dividing unit comprises dividing means. The dividing means may be selected from any kind of grinding means known to the skilled person and typically used for wet grinding. In particular, any kind of grinding means is suitable that is wear resistant under typical conditions used for wet grinding, especially under neutral to alkaline conditions (more precisely at a pH of 6 or above, preferably at a pH between 6 and 13 and more preferably at a pH between 6 and 11) and/or at temperatures above 10° C. (more precisely at a temperature between 10 and 90° C., preferably at a temperature between 15 and 70° C. and more preferably at a temperature between 20 and 50° C.).

In one preferred embodiment of the present invention, the dividing means are moving beads, preferably moving beads of mostly irregular shape. In this regard, it is appreciated that the dividing means being part of the at least one dividing unit have a weight median particle diameter $d_{50}$ value of from 0.01 mm to 100 mm, preferably from 0.1 mm to 75 mm and most preferably from 0.5 mm to 5 mm.

The dividing means, preferably in form of moving beads, being part of the at least one dividing unit are made of a mineral, pigment and/or filler material. In one preferred embodiment of the present invention, the minerals, pigments and/or fillers to be purified and/or prepared are preferably made of the same material.

For example, if the minerals, pigments and/or fillers to be purified are marble, the dividing means are also made of marble. If the minerals, pigments and/or fillers to be purified are limestone, the dividing means are also made of limestone. If the minerals, pigments and/or fillers to be purified are chalk, the dividing means are also made of chalk. If the minerals, pigments and/or fillers to be purified are dolomite, the dividing means are also made of dolomite. It is thus appreciated that the dividing means are preferably made of marble, limestone, chalk, dolomite and mixtures thereof.

Alternatively, the dividing means, preferably in form of moving beads, being part of the at least one dividing unit and the minerals, pigments and/or fillers to be purified and/or to be prepared are preferably made of different materials. In this case, the material of the beads may be selected independently from the material of the minerals, pigments and/or fillers to be purified and/or prepared.

Accordingly, it is appreciated that the dividing means, preferably in form of moving beads, being part of the at least one dividing unit are made of a material selected from the group comprising quartz sand, glass, porcelain, zirconium oxide, zirconium silicate and mixtures thereof, optionally comprising minor quantities of further minerals.

In one preferred embodiment of the present invention, the dividing means are melt blends of zirconium oxide and cerium oxide and/or yttrium oxide, most preferably the dividing means consist of a mixture of 80 to 84 wt.-% zirconium oxide and 20 to 16 wt.-% cerium oxide.

In this regard, at least a part of the suspension S prepared in the at least one mixing unit is subjected to said at least one dividing unit for the size reduction of the particles contained in the suspension S and the gaseous bubbles. In a preferred embodiment the at least one dividing unit is a grinding and/or crushing device, and is most preferably a grinding device. The size reduction of the particles contained in the suspension S and the gaseous bubbles in the at least one dividing unit provides the benefit that the (chemical) reaction speed in the inventive installation is increased by continuously producing a freshly prepared and hence active surface of the substance comprising at least one earth alkali carbonate and the optional at least one earth alkali hydroxide. In addition, this size reduction of the particles contained in the suspension S and the gaseous bubbles in the at least one dividing unit enables a continuous operation of the process.

In one preferred embodiment of the invention, the aqueous suspension obtained after the at least one dividing unit has a hardness from 5 to 130° dH, preferably from 10 to 60° dH, and most preferably from 15 to 50° dH.

For the purpose of the present invention, the hardness refers to the German hardness and is expressed in "degree German hardness, ° dH". In this regard, the hardness refers to the total amount of earth alkali ions in the aqueous solution comprising the earth alkali hydrogen carbonate, and is measured by complexometric titration at pH 10 using ethylene-diamine-tetra-actetic acid (EDTA) and Eriochrome T as equivalent point indicator.

The aqueous suspension obtained after the at least one dividing unit has preferably a pH in the range of 6.5 to 9, preferably in the range of 6.7 to 7.9, and most preferably in the range of 6.9 to 7.7, at 20° C.

Additionally or alternatively, the aqueous phase of the aqueous suspension obtained after the at least one dividing unit has a calcium ion concentration from 1 to 700 mg/l, preferably from 50 to 650 mg/l, and most preferably from 70 to 630 mg/l. According to another embodiment, the aqueous phase of the aqueous suspension obtained after the at least one dividing unit has a magnesium ion concentration from 1 to 200 mg/l, preferably from 2 to 150 mg/l, and most preferably from 3 to 125 mg/l.

According to still another embodiment of the present invention, the aqueous phase of the aqueous suspension obtained after the at least one dividing unit has a turbidity value of lower than 1.0 NTU, preferably of lower than 0.5 NTU, and most preferably of lower than 0.3 NTU.

The inventive installation comprises the at least one dividing unit such that it is assembled in a parallel arrangement with regard to the at least one membrane filtration unit or introduced in the at least one mixing unit. The at least one dividing unit can be arranged in such a way that only a part of the resulting suspension S that is contained in the at least one mixing unit passes through the at least one dividing unit before circulating back into the at least one mixing unit ("parallel arrangement"). If the at least one dividing unit is introduced in the at least one mixing unit, a part or all of the resulting suspension S passes the at least one dividing unit.

Before and/or parallel to and/or after the resulting suspension S of the at least one mixing unit passes the at least one dividing unit, the suspension S passes at least one membrane filtration unit.

One specific requirement of the present inventive is thus that the installation comprises at least one membrane filtration unit provided with at least one inlet and at least one outlet.

It is appreciated that the at least one membrane filtration unit is connected to the at least one mixing unit. Preferably, the at least one membrane filtration unit is connected to the at least one mixing unit such that the filtrand or retentate obtained in the at least one membrane filtration unit is circulated back into the at least one mixing unit of the inventive installation.

The term "filtrand or retentate" in the meaning of the present application refers to the part of the suspension S that is retained in the at least one membrane filtration unit because it cannot pass through the pores of the membrane being part of the membrane filtration unit and thus has not passed through the filter system of the at least one membrane filtration unit.

The at least one membrane filtration unit being part of the installation may be any kind of membrane filter known to the skilled person and typically used for filtering aqueous suspensions comprising minerals, pigments and/or fillers. For example, a microfiltration membrane and/or an ultrafiltration membrane may be used.

It is appreciated that there is a pressure difference between the inside of the membrane filtering unit and the surrounding environment so that suspended particles are separated from the suspension and a clear solution is obtained. Preferably, the pressure inside the membrane filtering unit is higher than the pressure of the surrounding environment.

A microfiltration membrane is a membrane having a pore size between 0.1 and 10 μm and is typically used to separate suspended particles from suspension. Microfiltration membranes may be of ceramic, polymer, or other synthetic materials. Preferably, said membranes have backpulse capability, i.e., a reverse flow of the filtrate by pressure through the membrane to the concentrated side of the aqueous suspension removes buildup of contaminants which tend to reduce the flow rate of the membrane.

In contrast thereto, an ultrafiltration membrane is a membrane having a pore size between 0.001 and 0.1 μm and is used to separate emulsions, proteins and macromolecules from suspension. The materials of construction are typically the same as for microfiltration membranes. Ultrafiltration membranes are either backpulsed as described above, or backwashed by closing a filtrate valve for a period of time.

For example, the at least one membrane filtration unit is a cross flow membrane filtration device. In one preferred embodiment of the present invention, the at least one membrane filtration unit is a cross flow membrane microfiltration device. Additionally or alternatively, the at least one membrane filtration unit is a cross flow membrane ultrafiltration device.

Cross flow membrane filtration devices are known to the skilled man. One cross flow membrane filtration device that may be suitable for the inventive installation includes the cross flow membrane filtration device available from Microdyn-Nadir GMBH, Germany as Mycrodyn Modul CMB 150.

It is appreciated that the at least one membrane filtration unit comprises at least one platy filter and/or tube filter and/or capillary filter membrane. Preferably, the at least one membrane filtration unit comprises at least one tube filter membrane. If the at least one membrane filtration unit comprises at least one tube filter membrane, the tube filter membrane preferably has an inner diameter of the tube of 0.01 mm to 25 mm, more preferably of 0.1 mm to 10 mm and most preferably of 0.1 to 7.5 mm. For example, the tube filter membrane has an inner diameter of the tube of 1 mm to 7.5 mm and preferably of 2.5 mm to 7.5 mm.

If the at least one membrane filtration unit comprises at least one capillary filter membrane, the capillary filter membrane preferably has an inner diameter of the capillary of 0.01 mm to 0.5 mm, and more preferably of 0.05 mm to 0.2 mm.

Tube filter membranes are preferred as they provide excellent flow conditions for the separation of solids at relatively low operating pressures and a high recirculation flow rate, as turbulent flow is produced at the membrane surface.

In one preferred embodiment of the present invention, the at least one membrane filtration unit comprises at least one membrane having a pore size of between 0.01 µm and 10 µm, preferably between 0.05 and 5 µm and most preferably between 0.1 and 2 µm.

It is further appreciated that the speed of flow across the at least one membrane of the cross flow membrane filtration device is between 0.1 m/s and 10 m/s, preferably between 0.5 m/s and 5 m/s and most preferably between 1 m/s and 4 m/s. Additionally or alternatively, the pressure at the inlet of the cross flow membrane filtration device is between 0 bar and 30 bar, preferably between 0.2 bar and 10 bar and most preferably between 0.5 and 5 bar.

In one preferred embodiment of the present invention, the at least one membrane is made of a material selected from the group comprising a sintered material, porous porcelain, synthetic polymers, like polyethylene, polypropylene or Teflon®, and mixtures thereof.

In one preferred embodiment of the invention, the aqueous solution obtained after the at least one membrane filtration unit has a hardness from 5 to 130° dH, preferably from 10 to 60° dH, and most preferably from 15 to 50° dH.

The aqueous solution obtained after the least one membrane filtration unit has preferably a pH in the range of 6.5 to 9, preferably in the range of 6.7 to 7.9, and most preferably in the range of 6.9 to 7.7, at 20° C.

Additionally or alternatively, the aqueous solution obtained after the least one membrane filtration unit has a calcium concentration from 1 to 700 mg/l, preferably from 50 to 650 mg/l, and most preferably from 70 to 630 mg/l. According to another embodiment, the aqueous solution obtained after the least one membrane filtration unit has a magnesium concentration from 1 to 200 mg/l, preferably from 2 to 150 mg/l, and most preferably from 3 to 125 mg/l.

According to still another embodiment of the present invention, the aqueous solution obtained after the least one membrane filtration unit has a turbidity value of lower than 1.0 NTU, preferably of lower than 0.5 NTU, and most preferably of lower than 0.3 NTU.

The inventive installation comprises the at least one membrane filtration unit such that it is assembled in a parallel arrangement with regard to the at least one dividing unit and/or in serial arrangement if the at least one dividing unit is introduced in the at least one mixing unit. The at least one membrane filtration unit may be arranged such that only a part of the resulting suspension S that is contained in the at least one mixing unit is fed into the at least one membrane filtration unit before the obtained filtrand or retentate (i.e. the part of the suspension S that is retained in the at least one membrane filtration unit because it cannot pass through the pores of the membrane being part of the membrane filtration unit) is circulated back into the at least one mixing unit. If the at least one dividing unit is introduced in the at least one mixing unit, a part or all of the resulting suspension S is fed into the at least one membrane filtration unit such that the obtained filtrand or retentate is circulated back to the at least one dividing unit that is introduced in the at least one mixing unit.

One specific requirement of the inventive installation is that the required units being part of the installation are connected in fluid communication. In other words, the single units of the installation are connected directly or indirectly by one or more tubes or pipes provided within, through and/or between the units such that the fluid connecting conduit (or pipeline) is extended out from an outlet of one unit and connected with an inlet of another unit.

It is thus appreciated that the installation comprises at least three outlets, preferably at least four outlets and more preferably at least five outlets. In one preferred embodiment of the present invention, the installation comprises at least three outlets or at least five outlets. Additionally or alternatively, the installation comprises at least four inlets, preferably at least five inlets and more preferably at least six inlets. In one preferred embodiment of the present invention, the installation comprises at least five inlets or at least six inlets.

For example, the installation comprises at least three outlets, preferably at least four outlets and more preferably at least five outlets or at least four inlets, preferably at least five inlets and more preferably at least six inlets. Alternatively, the installation comprises at least three outlets, preferably at least four outlets and more preferably at least five outlets and at least four inlets, preferably at least five inlets and more preferably at least six inlets. In particular, the installation comprises at least three outlets and at least five inlets, e.g. three outlets and five inlets. Alternatively, the installation comprises at least five outlets and at least six inlets, e.g. five outlets and six inlets.

Preferably, all outlets provided with the installation are liquid outlets.

One specific requirement of the inventive installation is that the at least one mixing unit is provided with at least two inlets and at least one outlet.

In one preferred embodiment of the present invention, the at least one mixing unit is provided with at least two outlets. Additionally or alternatively, the at least one mixing unit is provided with at least three inlets, preferably at least four inlets. Preferably, the at least one mixing unit is provided with at least one outlet and at least three inlets, preferably at least four inlets. For example, the at least one mixing unit is provided with one outlet and three inlets, preferably four inlets. In another preferred embodiment of the present invention, the at least one mixing unit is provided with at least two outlets and at least three inlets, preferably at least four inlets. For example, the at least one mixing unit is provided with two outlets and three inlets, preferably four inlets. In one preferred embodiment of the present invention, the at least one mixing unit is provided with multiple inlets and multiple outlets.

It is preferred that at least one inlet located at the at least one mixing unit is a powder inlet.

It is further appreciated that the at least one membrane filtration unit is provided with at least one inlet and at least one outlet. Preferably, the at least one membrane filtration unit is provided with at least one inlet and at least two outlets.

More preferably, the at least one membrane filtration unit is provided with multiple inlets and multiple outlets.

One specific requirement is that at least one outlet of the at least one mixing unit is connected to at least one inlet of the at least one membrane filtration unit and at least one outlet of the at least one membrane filtration unit is connected to at least one inlet of the at least one mixing unit. In this regard, it is appreciated that the filtrand or retentate obtained in the at least one membrane filtration unit is recirculated back into the at least one mixing unit of the inventive installation.

In one embodiment of the present invention, at least a part of the filtrate, i.e. the filtered aqueous solution comprising a soluble salt of the minerals, pigments and/or fillers obtained by passing the resulting suspension S through the filter system of the at least one membrane filtration unit, can be discharged from the at least one membrane filtration unit. Accordingly, the at least one membrane filtration unit is preferably equipped with an outlet suitable for discharging of at least a part of the filtered aqueous solution comprising a soluble salt of the minerals, pigments and/or fillers.

The purification of minerals, pigments and/or fillers and/or preparation of precipitated earth alkali carbonates and/or mineralization of water may be carried out in that $CO_2$ is introduced into the installation. In one preferred embodiment of the present invention, at least one inlet provided with the installation is a gas inlet. Preferably, the at least one gas inlet is a $CO_2$ inlet. For example, the inventive installation comprises one gas inlet.

It is appreciated that the at least one gas inlet may be located at the mixing unit and/or between the at least one mixing unit and the at least one dividing unit. In one preferred embodiment of the present invention, the at least one gas inlet is located at the mixing unit or between the at least one mixing unit and the at least one dividing unit.

If the at least one gas inlet is located between the at least one mixing unit and the at least one dividing unit, the gas inlet is preferably a venturi injector. More preferably, the venturi injector is located between the outlet of the at least one mixing unit and the inlet of the at least one dividing unit. In the meaning of the present patent application a venturi injector is a pump-like device that uses the Venturi effect of a converging-diverging nozzle to convert the pressure energy of a motive fluid to velocity energy which creates a low pressure zone that draws in and entrains a fluid by suction. After passing through the throat of the injector, the mixed fluid expands and the velocity is reduced which results in recompressing the mixed fluids by converting velocity energy back into pressure energy. The motive fluid may be a liquid, steam or any other gas. The fluid entrained by suction may be a gas, a liquid, a slurry, or a dust-laden gas stream.

The venturi injector can be located before (i.e. closer to the mixing unit) or after (i.e. closer to the dividing unit) the at least one pump that is located between the at least one mixing unit and the at least one dividing unit. One advantage of the use of a venturi injector is that a gas, e.g. $CO_2$ that is produced by the power generation can be introduced in the process that can be carried out with the inventive installation, so that the process can be almost run $CO_2$ neutral.

In one preferred embodiment of the present invention, the at least one gas inlet is located at the at least one mixing unit. For example, the at least one gas inlet may be located such that an introduction of gas into the aqueous suspension comprising at least one earth alkali carbonate and optionally at least one earth alkali hydroxide is obtained.

In another preferred embodiment of the present invention the stirring device is combined with a gas inlet such that a sufficient mixing or agitation is obtained in the aqueous suspension comprising at least one earth alkali carbonate and optionally at least one earth alkali hydroxide.

For example, if the at least one dividing unit is integrated in the at least one mixing unit, at least one inlet being a gas inlet is located at the top of the hollow shaft of the stirring device of the at least one mixing unit.

A flow control valve or other means may be used to control the rate of flow of carbon dioxide into the suspension comprising minerals, pigments and/or fillers to be purified. For example, a $CO_2$ dosing block and a $CO_2$ in-line measuring device may be used to control the rate of the $CO_2$ flow. The carbon dioxide dosage is preferably controlled by the pH of the produced aqueous earth alkali hydrogen carbonate solution.

Accordingly, it is appreciated that the at least one mixing unit comprises at least two inlets being liquid inlets. Preferably, the at least one mixing unit comprises at least three liquid inlets and more preferably at least four liquid inlets.

In one preferred embodiment of the present invention, the at least one mixing unit comprises at least two inlets being liquid inlets, more preferably at least three inlets being liquid inlets and at least one inlet being a gas inlet. For example, the at least one mixing unit comprises two inlets being liquid inlets, more preferably three inlets being liquid inlets and one inlet being a gas inlet. Preferably, the at least one mixing unit comprises three inlets being liquid inlets and one inlet being a gas inlet.

In another preferred embodiment of the present invention, the at least one mixing unit comprises at least three inlets being liquid inlets, more preferably at least four inlets being liquid inlets.

In case at least one gas inlet is located at the at least one mixing unit, the at least one mixing unit is preferably further provided with at least three inlets being liquid inlets. For example, the at least one mixing unit is provided with one inlet being a gas inlet and three inlets being liquid inlets.

Additionally or alternatively, the at least one mixing unit further comprises at least one inlet being a powder inlet.

According to one embodiment of the present invention, the at least one dividing unit comprises at least one inlet and at least one outlet. Preferably, the at least one dividing unit comprises one inlet and one outlet. In one preferred embodiment of the present invention, the at least one dividing unit is provided with multiple inlets and multiple outlets.

In one preferred embodiment of the present invention, at least one outlet of the at least one mixing unit is connected to at least one inlet of the at least one dividing unit and at least one outlet of the at least one dividing unit is connected to at least one inlet of the at least one mixing unit.

Alternatively, the at least one dividing unit is integrated in the at least one mixing unit. Preferably, if the at least one dividing unit is integrated in the at least one mixing unit, at least one inlet being a gas inlet is located at the top of the hollow shaft of the stirring device of the at least one mixing unit.

Preferably, if at least one outlet of the at least one mixing unit is connected to at least one inlet of the at least one dividing unit and at least one outlet of the at least one dividing unit is connected to at least one inlet of the at least one mixing unit, at least one inlet being a gas inlet is located between the at least one mixing unit and the at least one dividing unit. More preferably, if at least one outlet of the at least one mixing unit is connected to at least one inlet of the at least one dividing unit and at least one outlet of the at least one dividing unit is connected to at least one inlet of the at least one mixing unit, at least one inlet being a gas inlet is located between a feed pump of the at least one dividing unit and the at least one dividing unit. Most preferably, at least one inlet being a gas inlet is located at the inlet of the at least one dividing unit.

If at least one inlet being a gas inlet is located between the at least one mixing unit and the at least one dividing unit, the at least one mixing unit is preferably only provided with liquid inlets. Preferably, the at least one mixing unit is provided with at least three liquid inlets, more preferably at least four liquid inlets. For example, the at least one mixing unit is provided with four liquid inlets.

In one preferred embodiment of the present invention, the installation comprises at least one control unit regulating the filling level of the at least one mixing unit, pump speed, pH, conductivity, calcium ion concentration (e.g. by ion sensitive electrode) and/or temperature. The at least one control unit regulating the filling level of the at least one mixing unit, pump speed, pH, conductivity, calcium ion concentration (e.g. by ion sensitive electrode) and/or temperature may be operated collectively or separately.

The flow of fluid from one unit being part of the installation to another unit being part of the installation may be achieved by way of one or more intermediate (and not specifically mentioned or described) devices, pumps or apparatuses. Furthermore, such flow may or may not be selectively interruptible such as by valves, switches, control units and/or other suitable components.

In one preferred embodiment of the present invention, the installation comprises at least one pump, preferable at least two pumps and most preferably at least three pumps for directing the aqueous suspension S from one unit of the installation to another unit being part of the installation. For example, the installation comprises at least one pump located between the at least one mixing unit and the at least one membrane filtration unit. The pump is preferably designed such that the aqueous suspension S is directed from the at least one mixing unit to the at least one membrane filtration unit.

Additionally or alternatively, the installation comprises at least one pump located between the at least one mixing unit and the at least one dividing unit. The pump is preferably designed such that the aqueous suspension S is directed from the at least one mixing unit to the at least one dividing unit. It is appreciated that the at least one pump located between the at least one mixing unit and the at least one membrane filtration unit is preferably a venturi injector. More preferably, the venturi injector is located between the outlet of the at least one mixing unit and the inlet of the at least one dividing unit. For example, the venturi injector is located at the connection such as the tubes or pipes between the at least one mixing unit and the at least one dividing unit. It is noted that the foregoing only applies to the embodiments where the at least one dividing unit is not integrated in the mixing unit.

In one preferred embodiment of the present invention, the installation comprises at least two pumps, one located between the at least one mixing unit and the at least one membrane filtration unit and one located between the at least one mixing unit and the at least one dividing unit.

For example, if the at least one dividing unit is integrated in the at least one mixing unit, the installation preferably comprises only one pump located between the at least one mixing unit and the at least one membrane filtration unit. Otherwise, the installation preferably comprises two pumps. If the installation comprises two pumps, one pump is preferably located between the at least one mixing unit and the at least one membrane filtration unit while the other one is preferably located between the at least one mixing unit and the at least one dividing unit.

It is further appreciated that the pumping capacity of the at least one pump (in $m^3/h$ of the sum) feeding the at least one membrane filtration unit is 0.01 to 100 times the volume of the at least one mixing unit.

Additionally or alternatively, the ratio of the pumping capacity of the at least one pump (in $m^3/h$ of the sum) feeding the at least one dividing unit to the pumping capacity of the at least one pump (in $m^3/h$ of the sum) feeding the at least membrane filtration unit is between 1:1 and 1:1000. Preferably, the ratio of the pumping capacity of the at least one pump (in $m^3/h$ of the sum) feeding the at least one dividing unit to the pumping capacity of the at least one pump (in $m^3/h$ of the sum) feeding the at least membrane filtration unit is between 1:5 and 1:250.

In a preferred embodiment of the present invention, the installation is provided such that a continuous purification of minerals, pigments and/or fillers and/or preparation of precipitated earth alkali carbonate is achieved. However, the installation of the present invention can also be provided such that a semi-batch mode for the purification of minerals, pigments and/or fillers and/or preparation of precipitated earth alkali carbonate is achieved. In this case, the resulting suspension S can, for example, represent a total particle surface that is around 1 000 000 $m^2$/tonne and is provided to the installation of the present invention. Then, the product, i.e. the aqueous solution of the earth alkali hydrogen carbonate, is discharged from the installation until the remaining resulting suspension S represents a total particle surface that is around 1 000 $m^2$/tonne, and then a new amount of the at least one substance comprising at least one earth alkali carbonate and the optional at least one earth alkali hydroxide in a minor amount in respect to the earth alkali carbonate provided to the installation of the present invention. It is noted that the total particle surface can be determined during each point of the continuous installation by determining the specific surface area ($SSA_{total}$) of the aqueous suspension S as well as the dry content of the aqueous suspension S.

If the installation is provided in a continuous mode, the installation is preferably controlled by the amount of discharged aqueous solution comprising at least one earth alkali hydrogen carbonate. The amount of discharged aqueous solution comprising at least one earth alkali hydrogen carbonate may be determined by a volumetric method, e.g. by a flow meter, or by a gravimetric method, e.g. by using a scale. This value, i.e. the amount of discharged aqueous solution comprising at least one earth alkali hydrogen carbonate, is preferably used to control the (fresh) feed water valve.

The measurement of the solid content of the aqueous suspension S is carried out gravimetrically.

In one preferred embodiment of the present invention, the various units of the installation may be collectively or separately supplied with electricity for operation. Preferably, at least a part or all of the electrical power required for the present installation is derived from solar power, for example from thermal and/or voltammetry solar panels.

The resulting suspension S that is obtained has preferably solids content in the range from 0.1 to 80 wt.-%, preferably in the range from 3 to 50 wt.-%, more preferably in the range from 5 to 35 wt.-%, based on the total weight of the resulting suspension S. Additionally or alternatively, the particles in the suspension S that is obtained after the at least one dividing unit represent a specific surface area ($SSA_{total}$) of from 5 000 to 5 000 000 m²/tonne of the resulting suspension S, preferably of from 10 000 to 5 000 000 m²/tonne of the resulting suspension S, and more preferably of from 70 000 to 500 000 m²/tonne of the resulting suspension S, for example 100 000 to 500 000 m²/tonne.

The resulting suspension S and/or aqueous solution that is obtained after the at least one dividing unit and/or the at least one membrane filtration unit preferably comprises at least one earth alkali hydrogen carbonate.

According to one embodiment of the present invention, the aqueous suspension S and/or aqueous solution obtained after the at least one dividing unit and/or the at least one membrane filtration unit preferably comprises a calcium hydrogen carbonate, preferably in an amount of 25 to 150 mg/l and/or a magnesium hydrogen carbonate, preferably in an amount of >0 to 50 mg/l. Additionally or alternatively, the aqueous suspension S and/or aqueous solution obtained after the at least one dividing unit and/or the at least one membrane filtration unit preferably comprises a mixture of a calcium and a magnesium hydrogen carbonate, preferably in a total amount of 25-200 mg/l.

In one preferred embodiment of the present invention, the aqueous suspension S and/or aqueous solution obtained after the at least one dividing unit and/or the at least one membrane filtration unit preferably comprises 45 mg/l calcium hydrogen carbonate, or 80 to 120 mg/l calcium hydrogen carbonate and 20 to 30 mg/l magnesium hydrogen carbonate.

A mixture of calcium and a magnesium hydrogen carbonate can be obtained when dolomite, half burned and/or fully burned dolomite containing material is used as the substance comprising the earth alkali carbonate. In the meaning of the present invention burned dolomite comprises calcium oxide (CaO) and magnesium oxide (MgO), whereas half burnt dolomite comprises Mg in the form of magnesium oxide (MgO) and Ca in the form of calcium carbonate ($CaCO_3$), but can also include some minor amount of calcium oxide (CaO).

By heating the resulting permeate solution that is obtained after the at least one dividing unit and the at least one membrane filtration unit, water is evaporated from the solution and upon a certain point of time the earth alkali carbonate starts to precipitate out of the solution.

Said heating of the resulting permeate solution that is obtained after the at least one dividing unit and the at least one membrane filtration unit may be achieved in the at least one mixing unit comprising a heating device. Alternatively, the resulting permeate solution obtained after the at least one dividing unit and the at least one membrane filtration unit may be directed to another mixing unit comprising a heating device.

In one preferred embodiment of the present invention, the permeate solution is typically adjusted with the heating device to a temperature from 45° C. to 90° C. and preferably from 55° C. to 80° C.

The invention is explained in the following in more detail in connection with the drawings with reference to two embodiments of installations.

Figure 2:
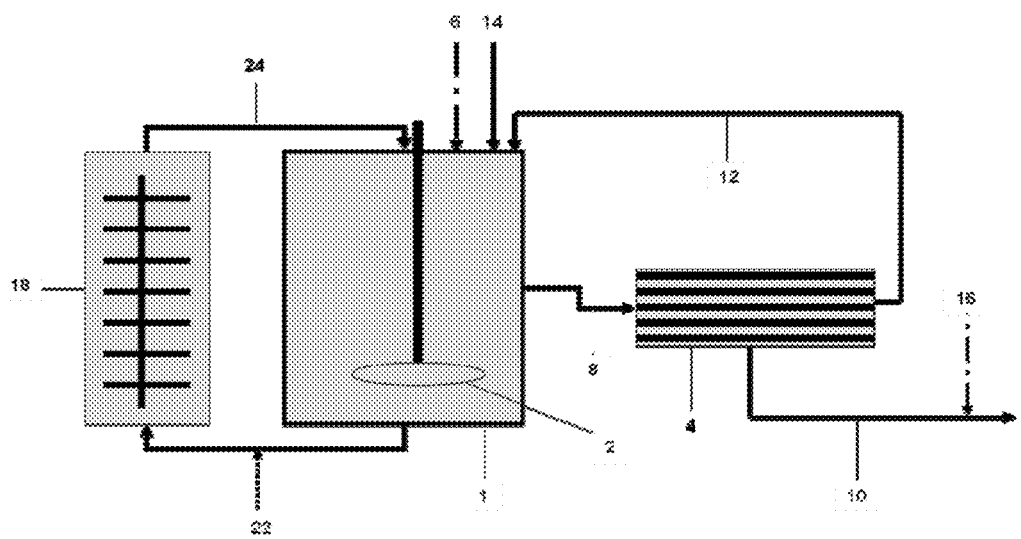

As shown in FIG. 2, one embodiment of the inventive installation comprises a mixing unit (1) equipped with a stirrer (2), at least one inlet for water (14) and the minerals, pigments and/or fillers (6) to be purified and/or prepared, either in a dry or in an aqueous form. Connected with an outlet of the mixing unit (1), there is a membrane filtration unit (4) provided with at least one inlet and at least one outlet, where at least a part of the resulting suspension S obtained in the mixing unit (1) is fed to. The membrane filtration unit (4) preferably retains coarse particles that are contained in the aqueous suspension S, i.e. all particles having a size of at least 0.2 µm. At least a part of the resulting suspension S that exits the membrane filtration unit (4) is recirculated back through a connection (12) such as tubes or pipes into the mixing unit (1). Accordingly, the membrane filtration unit (4) is connected to the mixing unit such that the content of the membrane filtration unit (4) can be recirculated to the mixing unit (1). In particular, it is to be noted that the filtrand or retentate obtained in the membrane filtration unit (4) is recirculated back into the mixing unit (1). One specific requirement of the inventive installation thus is that the at least one outlet of the mixing unit (1) is connected to at least one inlet of the membrane filtration (4) unit and at least one outlet of the membrane filtration unit (4) is connected to at least one inlet of the mixing unit (1).

Optionally, at least a part of the filtered aqueous solution comprising a soluble salt of the minerals, pigments and/or fillers to be purified and/or prepared, i.e. the filtrate (10), may be discharged through an outlet from the membrane filtration unit (4). Accordingly, the membrane filtration unit (4) may be equipped with another outlet for discharging of at least a part of the aqueous solution comprising a soluble salt of the minerals, pigments and/or fillers, i.e. the filtrate (10) obtained by passing the resulting suspension S through the filter system of the at least one membrane filtration unit (4).

The discharged solution comprising a soluble salt of the minerals, pigments and/or fillers, i.e. the filtrate (10), may, optionally, be subjected to further treatments (16) such as for example a mechanical treatment, preferably by a degasing device, such as for example by an ultrasonic and/or vacuum device. Most preferably the resulting gas phase obtained by the degasing device is re-injected via a gas pipe into the process by a venturi injector, such as tubes or pipes, between the mixing unit (1) and dividing unit (18) and the vacuum is preferably produced by this venturi injector. In addition biocides or other additives can be added to the process in order to change the pH of the solution (e.g. addition of a base such as NaOH), the conductivity of the solution, or the hardness of the solution. As a further option, the clear aqueous solution comprising a soluble salt of the minerals, pigments and/or fillers, i.e. the filtrate (10), discharged from the membrane filtration unit (4) can be diluted with further water. The coarse mineral, pigment and/or filler particles contained in the aqueous suspension S and that are retained in the filtering device can optionally be recirculated to the reactor, i.e. into the at least one mixing unit (1), in order to be available for further conversion and/or purification.

In parallel to the membrane filtration unit (4), the installation comprises a dividing unit (18) comprising dividing means. The grinding device (18) is connected to the mixing unit (1) in such a way that at least a part of the content of the dividing unit (18) can be recirculated to the mixing unit (1). Accordingly, at least one outlet of the mixing unit (1) is connected to at least one inlet of the dividing unit (18). Furthermore, at least one outlet of the dividing unit (18) is connected to at least one inlet of the mixing unit (1).

A part of the resulting suspension S obtained in the mixing unit (1) having a pH of between 6 and 9 is fed through a connection (8), such as tubes or pipes, to the membrane filtration unit (4), whereas another part of the resulting suspension S obtained in the mixing unit (1) having a pH of between 6 and 9 is fed to the dividing unit (18). In this embodiment, the $CO_2$ (22) is preferably fed into the installation before the dividing unit (18). The resulting ground aqueous suspension obtained after the dividing unit (18) is then circulated (24) from the dividing unit (18) back to the mixing unit (1).

Figure 3:
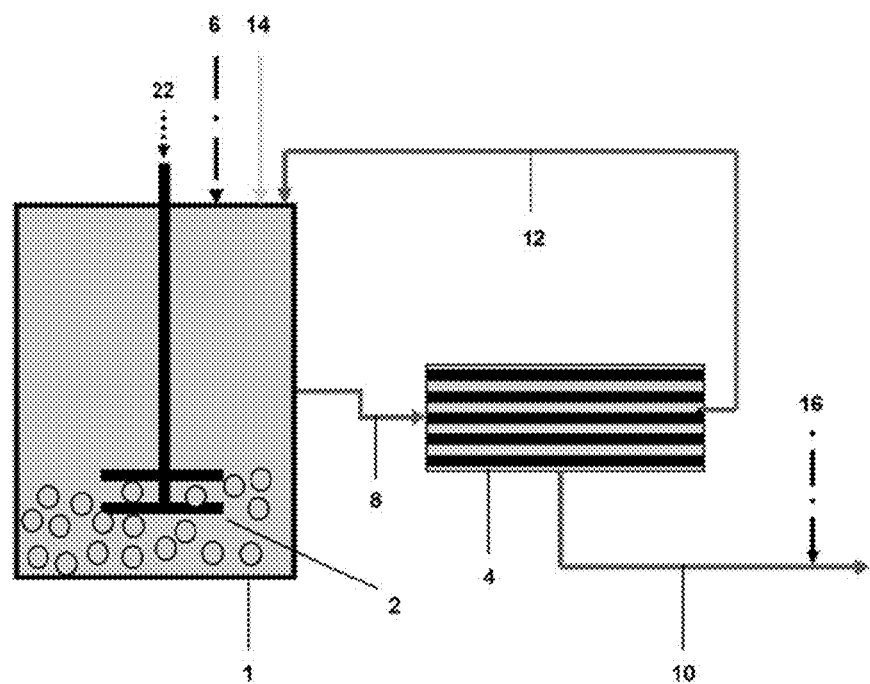

As shown in FIG. 3, one embodiment of the inventive installation comprises a mixing unit in which a dividing unit (1) is integrated. The combined mixing/dividing unit (1) is equipped with a stirrer (2) and additional dividing means such as grinding beads. Furthermore, the installation comprises at least one inlet for water (14) and the minerals, pigments and/or fillers (6) to be purified and/or prepared, either in a dry or in an aqueous form. Connected with an outlet of the combined mixing/dividing unit (1), there is a membrane filtration unit (4) provided with at least one inlet and at least one outlet, where at least a part of the resulting suspension S obtained in the combined mixing/dividing unit (1) is passed through. The membrane filtration unit (4) preferably retains coarse particles that are contained in the aqueous suspension, i.e. all particles having a size of at least 0.2 μm. At least a part of the resulting suspension S that exits the membrane filtration unit (4) is recirculated back through a connection (12), such as tubes or pipes, into the combined mixing/dividing unit (1). Accordingly, the membrane filtration unit (4) is connected to the combined mixing/dividing unit (1) such that the content of the membrane filtration unit (4) can be recirculated to the combined mixing/dividing unit (1). In particular, it is to be noted that the filtrand or retentate obtained in the membrane filtration unit (4) is circulated back into the combined mixing/dividing unit (1). One specific requirement of the inventive installation thus is that the at least one outlet of the combined mixing/dividing unit (1) is connected to at least one inlet of the membrane filtration (4) unit and at least one outlet of the membrane filtration unit (4) is connected to at least one inlet of the combined mixing/dividing unit (1).

Optionally, at least a part of the filtered aqueous solution comprising a soluble salt of the minerals, pigments and/or fillers to be purified and/or prepared, i.e. the filtrate (10), may be discharged through an outlet from the membrane filtration unit (4). Accordingly, the membrane filtration unit (4) may be equipped with another outlet for discharging of at least a part of the aqueous solution comprising a soluble salt of the minerals, pigments and/or fillers, i.e. the filtrate (10) obtained by passing the resulting suspension S through the filter system of the at least one membrane filtration unit (4).

The discharged solution comprising a soluble salt of the minerals, pigments and/or fillers, i.e. the filtrate (10) may, optionally, be subjected to further treatments (16) such as for example a mechanical treatment or the addition of biocides or other additives in order to change the pH of the solution (e.g. addition of a base such as NaOH), the conductivity of the solution, or the hardness of the solution. As a further option, the clear aqueous solution comprising a soluble salt of the minerals, pigments and/or fillers discharged from the membrane filtration unit (4) can be diluted with further water. The coarse mineral, pigment and/or filler particles contained in the suspension and that are retained in the filtering device can optionally be recirculated to the reactor, i.e. into the combined mixing/dividing unit (1), in order to be available for further conversion and/or purification.

Accordingly, at least a part of the resulting suspension S obtained in the combined mixing/dividing unit (1) having a pH of between 6 and 9 is fed through a connection (8), such as tubes or pipes, to the membrane filtration unit (4). In this embodiment, the $CO_2$ (22) is preferably fed into the combined mixing/dividing unit (1) of the installation. Preferably, the stirrer (2) is a mixing machine, wherein a simultaneous mixing of the aqueous suspension and dosing of $CO_2$ (4) is possible.

Figure 4:
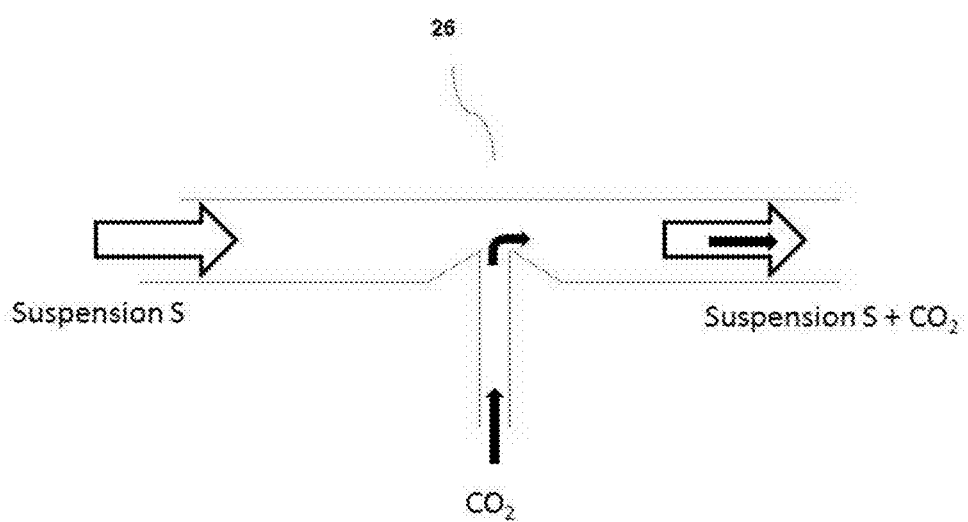

FIG. 4 shows a venturi injector (26) that can be used as gas inlet with the installation according to the present invention. The venturi injector is a pump-like device that uses the Venturi effect of a converging-diverging nozzle to convert the pressure energy of a motive fluid to velocity energy which creates a low pressure zone that draws in and entrains a fluid by suction. After passing through the throat of the injector, the mixed fluid expands and the velocity is reduced which results in recompressing the mixed fluids by converting velocity energy back into pressure energy. The motive fluid may be a liquid, steam or any other gas. The fluid entrained by suction may be a gas, a liquid, a slurry, or a dust-laden gas stream.

In the present case, the venturi injector is used to suck $CO_2$ gas in the suspension S that is coming from the mixing unit in order to obtain the aqueous suspension S that contains bubbles of $CO_2$.

The venturi injector can be located before (i.e. closer to the mixing unit) or after (i.e. closer to the dividing unit) the at least one pump that is located between the at least one mixing unit and the at least one dividing unit. One advantage of the use of a venturi injector is that a gas, e.g. $CO_2$ that is produced by the power generation can be introduced in the process that can be carried out with the inventive installation, so that the process can be almost run $CO_2$ neutral.

FIGURES

FIG. 1 illustrates an installation as described in the prior art.

FIG. 2 illustrates an embodiment of the present installation comprising a mixing unit, a dividing unit and a membrane filtration unit, wherein at least one outlet of the at least one mixing unit is connected to at least one inlet of the at least one membrane filtration unit and at least one outlet of the at least one membrane filtration unit is connected to at least one inlet of the at least one mixing unit.

FIG. 3 illustrates an embodiment of the present installation comprising a dividing unit integrated in the mixing unit and a membrane filtration unit, wherein at least one outlet of the at least one mixing unit is connected to at least one inlet of the at least one membrane filtration unit and at least one outlet of the at least one membrane filtration unit is connected to at least one inlet of the at least one mixing unit.

FIG. 4 illustrates a venturi injector that can be used as gas inlet with the installation according to the present invention.

The scope and interest of the invention will be better understood based on the following examples which are intended to illustrate certain embodiments of the invention and are non-limitative.

EXAMPLES

Specific Surface Area (SSA) of a Material

The specific surface area (SSA) was measured using a Malvern Mastersizer 2000 (based on the Fraunhofer equation).
Particle Size Distribution (Mass % Particles with a Diameter <X) and Weight Median Diameter ($d_{50}$) of a Particulate Material Weight median grain diameter and grain diameter mass distribution of a particulate material were determined using a Malvern Mastersizer 2000 (based on the Fraunhofer equation).
pH of an Aqueous Suspension or Solution The pH was measured using a Mettler-Toledo pH meter. The calibration of the pH electrode was performed using standards of pH values 4.01, 7.00 and 9.21.
Solids Content of an Aqueous Suspension The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Turbidity

The turbidity was measured with a Hach Lange 2100AN IS Laboratory Turbidimeter and the calibration was performed using StabCal turbidity standards (formazine standards) of <0.1, 20, 200, 1000, 4000 and 7500 NTU.

Determination of the Hardness (German Hardness; Expressed in "° dH")

The hardness refers to the total amount of earth alkali ions in the aqueous suspension comprising the earth alkali hydrogen carbonate, and it is measured by complexometric titration using ethylene-diamine-tetra-actetic acid (EDTA; trade name Titriplex III) and Eriochrome T as equivalent point indicator.

EDTA (chelating agent) forms with the ions $Ca^{2+}$ and $Mg^{2+}$ soluble, stable chelate complexes. 2 ml of a 25% ammonia suspension, an ammonia/ammonium acetate buffer (pH 10) and Eriochrome black T indicator were added to 100 ml of a water sample to be tested. The indicator and the buffer is usually available as so-called "indicator-buffer tablet". The indicator, when masked with a yellow dye, forms a red colored complex with the $Ca^{2+}$ and $Mg^{2+}$ ions. At the end of the titration, that is when all ions are bound by the chelating agent, the remaining Eriochrome black T indicator is in its free form which shows a green color. When the indicator is not masked, then the color changes from magenta to blue. The total hardness can be calculated from the amount of EDTA that has been used.

Table 1 below shows a conversion for the different units of the water hardness.

TABLE 1

Conversion for the different units of the water hardness[1]

|  |  | ° dH | ° e | ° fH | ppm | mval/l | mmol/l |
|---|---|---|---|---|---|---|---|
| German Hardness | 1° dH = | 1 | 1.253 | 1.78 | 17.8 | 0.357 | 0.1783 |
| English Hardness | 1° e = | 0.798 | 1 | 1.43 | 14.3 | 0.285 | 0.142 |
| French Hardness | 1° fH = | 0.560 | 0.702 | 1 | 10 | 0.2 | 0.1 |
| ppm $CaCO_3$ (USA) | 1 ppm = | 0.056 | 0.07 | 0.1 | 1 | 0.02 | 0.01 |
| mval/l Earth alkali ions | 1 mval/l = | 2.8 | 3.51 | 5 | 50 | 1 | 0.50 |
| mmol/l Earth alkali ions | 1 mmol/l = | 5.6 | 7.02 | 10.00 | 100.0 | 2.00 | 1 |

[1]In this regard the unit ppm is used in the meaning of 1 mg/l $CaCO_3$.

Comparative Installation

A general process flow sheet of the installation used for the comparative example is shown in FIG. 1 (Device A). The installation comprises a feed tank having a feed tank volume of 50 l, which was fed with 45 l of suspension, as mixing unit including a stirrer and a crossflow membrane microfilter, wherein the suspension comprising minerals, pigments and/or fillers introduced into the mixing unit is withdrawn through an outlet locate at the mixing unit and directed and passed through the crossflow membrane microfilter. At least a part of the filtrate exiting the crossflow membrane microfilter is directed back to the mixing unit. The cross flow membrane microfilter has a total membrane area of 0.6 $m^2$ (3 modules serial of 0.2 $m^2$/module) and an inner tube diameter of 6 mm.

Inventive Installations

A general process flow sheet of one installation according to the present invention is shown in FIG. 2 (Device B). The installation comprises a feed tank having a feed tank volume of 50 l, which was fed with 45 l of suspension, as mixing unit including a stirrer and a crossflow membrane microfilter and a dividing unit which are installed in parallel. The suspension comprising minerals, pigments and/or fillers introduced into the mixing unit may thus be withdrawn simultaneously or independently through at least two outlets located at the mixing unit and directed and passed through the crossflow membrane microfilter and/or dividing unit. At least a part of the filtrate exiting the crossflow membrane microfilter and/or the suspension exiting the dividing unit is directed back to the mixing unit. The cross flow membrane microfilter has a total membrane area of 0.6 $m^2$ (3 modules serial of 0.2 $m^2$/module) and an inner tube diameter of 6 mm.

A general process flow sheet of another installation according to the present invention is shown in FIG. 3 (Device C). The installation comprises a mixing unit in which the dividing unit is integrated and equipped with a stirrer and grinding beads made of zirconium oxide. The installation further comprises a crossflow membrane microfilter such that the suspension comprising minerals, pigments and/or fillers introduced into the mixing/dividing unit is withdrawn through an outlet located at the mixing/dividing unit and directed and passed through the crossflow membrane microfilter. At least a part of the filtrate exiting the crossflow membrane microfilter is directed back to the mixing/dividing unit.

The feed water used in the inventive examples was obtained from an ion exchange equipment of Christ, Aesch, Switzerland Type Elite 1BTH, the feed water having the following water specification after the ion exchanger:

| Sodium | 169 mg/l |
|---|---|
| Calcium | 2 mg/l |
| Magnesium | <1 mg/l |
| °dH | 0.3 |

Example 1, Microdol A Extra (Dolomite)

In the present example, Microdol A extra a dolomite obtained from the Company Norwegian Talc, Knarrevik, was used as the at least one earth alkali carbonate.

The goal of the trials in Example 1 was to produce a suspension of earth alkali hydrogen carbonate of a pH of 7.2±0.1 out of dolomite at ambient temperature.

The dolomite feed material at the beginning of the trial had a $d_{10}$ of 0.35 µm, a $d_{50}$ of 2.75 µm and a $d_{90}$ of 10.53 µm.

The reaction and operation conditions are given in Tables 2 and 3

Comparative:

Trial a) Device A, (tank temperature 23° C.)

Feed flow to the cross flow membrane microfilter: 2.0 $m^3$/h

TABLE 2

| Feed solids wt.-%/running time in minutes | $CO_2$ ml/min | ° dH Permeate | l/h of Permeate | l/h of Permeate at 10° dH | Membrane pressure [bar] | l/h/m² Permeate at 10° dH | pH permeate | $d_{10}$ $d_{50}$ $d_{90}$ |
|---|---|---|---|---|---|---|---|---|
| 15 wt.-% 180 min | 200 | 32.5 | 43 | 138 | 2 | 231 | 7.14 | 0.35 μm 2.68 μm 10.5 μm |

Inventive:
Trial b) Device B, (tank temperature 25° C.)
Feed flow to the cross flow membrane microfilter: 2.0 m³/h
Feed flow to the dividing device: 0.20 m³/h

TABLE 3

| Feed solids wt.-%/trial running time | $CO_2$ ml/min | ° dH Permeate | l/h Permeate | l/h of Permeate at 10° dH | Membrane pressure [bar] | l/h/m² Permeate at 10° dH | pH permeate | $d_{10}$ $d_{50}$ $d_{90}$ |
|---|---|---|---|---|---|---|---|---|
| 15 wt.-% 165 min. | 250 | 50 | 40 | 209 | 2 | 349 | 7.3 | 0.28 μm 1.05 μm 3.74 μm |

From Table 3 (invention) it can be gathered that the capacity of permeate in l/h/m² using the inventive equipment is increased by a factor of 1.5 compared to the capacity of permeate obtained in a prior art equipment as outlined in Table 2 (prior art). In particular, the medium particle diameter ($d_{50}$) of particles in the suspension S obtained in the inventive equipment was determined as being 1.05 μm, while the medium diameter ($d_{50}$) of particles in the suspension S using the prior art equipment stays nearly constant. Turbidity of the permeate sample obtained in the inventive equipment and taken after 165 min. was <0.3 NTU.

Example 2, Microdol A Extra (Dolomite)

In the present example, Microdol A extra a dolomite as described in Example 1 was used as the at least one earth alkali carbonate.

The goal of the trials in Example 2 was to produce a suspension of earth alkali hydrogen carbonate of a pH of 7.8±0.1 out of dolomite at an increased temperature of 40° C.

The Dolomite feed material at the beginning of the trial had a $d_{10}$ of 0.35 μm, a $d_{50}$ of 2.75 μm and a $d_{90}$ of 10.53 μm.

The reaction and operation conditions are given in Table 4.

Inventive:
Trial c) Device B, (tank temperature 40° C.)
Feed flow to the cross flow membrane microfilter: 2.0 m³/h Feed flow to the dividing device: 0.20 m³/h From Table 4 it can be gathered that the capacity of permeate in l/h/m² using the inventive equipment at 40° C. is increased by a factor of 1.33 compared to the capacity of permeate obtained in the inventive equipment at 25° C. and compared to the prior art equipment as outlined in Table 2 (prior art) even by a factor of 2.0.

The Examples clearly show the improvement of efficiency of the inventive installations of Trial b) and c) versus Trial a).

Example 3, Raw Marble, Carinthia, Austria

In the present example, a raw marble from the region of Carinthia, Austria was used. The HCl insoluble content was 7.5 wt.-% (approx. 90 wt % mica and 10 wt.-% quartz, determined by XRD).

The Marble feed material at the beginning of the trial had a $d_{10}$ of 1.0 μm, a $d_{50}$ of 24.5 μm and a $d_{90}$ of 104 μm. The specific surface area (SSA) was <0.1 m²/g.

The reaction and operation conditions of the installation can be gathered from Table 5.

Trial d), Device B, (mix tank temperature 24° C.)
Feed flow to the cross flow membrane microfilter: 2.0 m³/h Feed flow to the dividing device: 0.065 m³/h

TABLE 4

| Feed solids wt.-%/trial running time | $CO_2$ ml/min | ° dH Permeate | l/h Permeate | l/h of Permeate at 10° dH | Membrane pressure [bar] | l/h/m² Permeate at 10° dH | pH permeate | $d_{10}$ $d_{50}$ $d_{90}$ |
|---|---|---|---|---|---|---|---|---|
| 8 wt.-% 165 min | 100 | 38 | 74 | 280 | 1 | 467 | 7.7 | 0.32 μm 1.26 μm 3.72 μm |

TABLE 5

| Feed solids wt.-%/trial running time | $CO_2$ ml/min | ° dH Permeate | l/h Permeate | l/h of Permeate at 10° dH | Membrane pressure [bar] | l/h/m² Permeate at 10° dH | pH permeate | $d_{10}$ $d_{50}$ $d_{90}$ |
|---|---|---|---|---|---|---|---|---|
| 5 wt.-% 105 min | 200 | 25 | 5.4 | 13.5 | 0 | 23 | 7.17 | 0.30 μm 1.18 μm 6.16 μm 3.07 m²/g |
| 5 wt.-% 165 min | 300 | 42.5 | 42.2 | 179 | 1 | 299 | 6.7 | 0.32 μm 1.2 μm 5.56 μm not determined |
| 5 wt.-% 180 min | 300 | 40.0 | 79.6 | 318 | 2 | 351 | 6.7 | not determined |

The total particle surface area ($SSA_{total}$) of the suspension S obtained in the inventive equipment and taken after 105 min. represented 185000 m²/tonne of suspension S.

Turbidity of the permeate sample obtained in the inventive equipment taken after 165 min. was <0.3 NTU.

2 liters of clear permeate obtained after 180 min were heated for 2 h at 70° C., and the resulting precipitate was collected by filtering using a laboratory membrane filter disc having a diameter of 50 mm and a pore size of 0.2 μm (produced by Millipore).

The XRD analysis of the resulting precipitate shows the following:

| | |
|---|---|
| Aragonitic PCC | 97.3 wt.-% |
| Calcitic PCC | 2.7 wt.-% |
| Silica/Silicates (Mica) | <0.1 wt.-% |
| HCl insol. | <0.1 wt.-% |

Hence, the XRD results and the HCl insoluble content show that a very clean $CaHCO_3$ solution as well as very pure precipitated calcium carbonate is obtained from a starting material that contains a HCl insoluble content (impurities) of 7.5 wt.-%.

This example clearly demonstrates that the inventive installation produces very pure extraction solutions as well as minerals, pigments and/or fillers out of impure starting material. This example shows the use of the inventive installation as a cost efficient alternative to processes where chemicals are used to separate the mineral, pigment and/or filler phases.

Example 4, Dolomite/Limestone Blend

Pilot Plant Trial

In the present example, one part Microdol A extra a dolomite as described in Example 1 was mixed with two parts of limestone of the region of Avignon, France, and was used as the blend of earth alkali carbonates.

The goal of the trial in Example 4 was to produce a solution of earth alkali hydrogen carbonate of a pH of 6.5 to 6.7 in pilot scale.

The blend of earth alkali carbonates had a $d_{10}$ of 0.43 μm, a $d_{50}$ of 2.43 μm and a $d_{90}$ of 6.63 μm at the beginning of the trial.

The blend was fed as 50 wt.-% suspension in water.

The reaction and operation conditions of the installation can be gathered from Table 6.

Inventive:

Trial e) Device B, (tank temperature 18.5° C.)

The installation comprises a feed tank having a feed tank volume of 1,000 l as mixing unit including a stirrer and a crossflow polyethylene membrane microfilter as the crossflow membrane microfiltration unit and a dividing unit which are installed in parallel. The suspension comprising minerals, pigments and/or fillers introduced into the mixing unit may thus be withdrawn simultaneously or independently through at least two outlets located at the mixing unit and directed and passed through the crossflow membrane microfiltration unit and/or dividing unit. At least a part of the filtrate exiting the crossflow membrane microfiltration unit and/or the suspension exiting the dividing unit is directed back to the mixing unit. The cross flow polyethylene membrane microfilter has a total membrane area of 8 m², an inner tube diameter of 5.5 mm and is 3 m long. Furthermore, the microfilter has a pore diameter of 1.0 μm and comprises 174 tubes in parallel (Seprodyn filter module SE 150 TP 1L/DF, Microdyn).

Feed water: deionized water obtained from an ion exchange equipment of Christ, Aesch, Switzerland, (<1 mg/l earth alkali carbonate).

Feed flow of suspension S to the cross flow membrane unit: 36 m³/h, speed across the membranes: 3 m/s.

Pressure at the cross flow membrane inlet: 1 bar

Pressure at the cross flow membrane outlet: 0.3 bar

Pressure at the solution outlet: 0.05 bar

Feed flow of suspension S to the dividing device: 0.40 m³/h

Pressure at the dividing unit inlet: 0.7 to 0.8 bar

Dose of $CO_2$: 2.0 liter/min at a pressure of 1.5 to 1.6 bar.

Feed solids of suspension S: 15 wt.-%

Results are measured after 44 hours continuous running.

TABLE 6

| ° dH Permeate | m³/h Permeate | Earth alkali ion concentration in the permeate | m³/h of Permeate at 10° dH | l/h/m² Permeate at 10° dH | pH permeate | $d_{10}$ $d_{50}$ $d_{90}$ SSA |
|---|---|---|---|---|---|---|
| 33 | 0.5 | $Ca^{2+}$: 214 mg/l $Mg^{2+}$: 20 mg/l | 1.65 | 0.21 | 6.7 | 0.34 μm 1.47 μm |

TABLE 6-continued

| °dH Permeate | m³/h Permeate | Earth alkali ion concentration in the permeate | m³/h of Permeate at 10° dH | l/h/m² Permeate at 10° dH | pH permeate | $d_{10}$ $d_{50}$ $d_{90}$ SSA |
|---|---|---|---|---|---|---|
| | | | | | | 4.11 µm 2.72 m²/g |

The specific particle surface of the suspension S obtained in the inventive installation and taken after 44 hours was 408,000 m²/tonne of suspension S.

A first quality of tap water comprising 45 mg/l earth alkali carbonate (sum of $CaCO_3/MgCO_3$) was produced by diluting the permeate of this trial with feed water. The resulting capacity of this trial corresponds to approximately 6.7 m³/h at a concentration of 45 mg/l earth alkali carbonate.

A second quality of tap water comprising 100 mg/l earth alkali carbonate 1($CaCO_3$) and 10-15 mg/l of earth alkali carbonate 2 ($MgCO_3$) was produced by diluting the permeate of this trial with feed water. The resulting capacity of this trial corresponds to approximately 2.7 m³/h at a concentration of 100 mg/l $CaCO_3$ and 10-15 mg/l $MgCO_3$.

The total electrical power consumption of the inventive installation to obtain 1 m³ of the second quality of tap water was 0.07 to 0.12 kWh per m³ of tap water quality 2.

The electrical power consumption for the mill part of the inventive installation to obtain 1 m3 of the second quality of tap water was 0.06-0.09 kWh per m3 of tap water quality 2.

The invention claimed is:

1. A process for the purification of minerals, pigments or fillers, the process comprising purifying the minerals, pigments or fillers by:
   a) introducing said minerals, pigments or fillers to at least one mixing unit provided with at least two inlets and at least two outlets to form a suspension,
   b) introducing at least a portion of the suspension to at least one dividing unit comprising dividing means, said dividing unit being separate from said mixing unit and having an inlet in fluid communication with an outlet of said mixing unit for receiving the suspension and an outlet in fluid communication with an inlet of said mixing unit for returning the suspension,
   c) introducing at least a portion of the suspension to at least one membrane filtration unit provided with at least one inlet and at least one outlet, wherein at least one outlet of the at least one mixing unit is connected to at least one inlet of the at least one membrane filtration unit for receiving the suspension and at least one outlet of the at least one membrane filtration unit is connected to at least one inlet of the at least one mixing unit for returning a portion of the suspension; and
   d) introducing $CO_2$ to the suspension.

2. The process according to claim 1, wherein the at least one mixing unit stirs the suspension.

3. The process according to claim 1, further comprising operating a heating device associated with the at least one mixing unit to heat the suspension to a temperature of between 5° C. and 90° C. or between 20° C. and 50° C.

4. The process according to claim 1, wherein at least one grinding device and/or at least one crushing device is operated in association with the at least one dividing unit.

5. The process according to claim 4, wherein the at least one dividing unit is at least one vertical grinding device and/or at least one vertical crushing device or at least one horizontal grinding device and/or at least one horizontal crushing device.

6. The process according to claim 4, wherein the at least one dividing unit is a conical annular gap bead mill.

7. The process according to claim 1, wherein the at least one dividing unit comprises dividing means having a weight median particle diameter $d_{50}$ value of from 0.01 mm to 100 mm, or from 0.1 mm to 75 mm, or from 0.5 mm to 5 mm.

8. The process according to claim 1, wherein the at least one dividing unit comprises moving beads as dividing means made of a material selected from the group comprising quartz sand, glass, porcelain, zirconium oxide, zirconium silicate and mixtures thereof, optionally comprising minor quantities of further minerals.

9. The process according to claim 1, wherein the dividing means of the at least one dividing unit are made of a mineral, pigment and/or filler material.

10. The process according to claim 1, wherein the dividing means and the minerals, pigments and/or fillers to be purified are of the same material.

11. The process according to claim 1, wherein the at least one membrane filtration unit is a cross flow membrane filtration device, a cross flow membrane microfiltration device and/or a cross flow membrane ultrafiltration device.

12. The process according to claim 11, wherein the at least one membrane filtration unit is a cross flow membrane filtration device comprising at least one tube filter membrane having an inner diameter of the tube from 0.01 mm to 25 mm, or from 0.1 mm to 10 mm.

13. The process according to claim 11, wherein the at least one membrane filtration unit comprises at least one membrane having a pore size of between 0.01 µm and 10 µm, or of between 0.05 µm and 5 µm, or of between 0.1 µm and 2 µm.

14. The process according to claim 13, wherein the membrane is made from a sintered material, a porous porcelain, a synthetic polymer, polyethylene, polypropylene, polytetrafluoroethylene, or any mixture thereof.

15. The process according to claim 11, wherein the at least one membrane filtration unit is a cross flow membrane filtration device having a speed of flow across its at least one membrane of between 0.1 m/s and 10 m/s, or between 0.5 m/s and 5 m/s, or between 1 m/s and 4 m/s, and/or an inlet pressure of between 0 bar and 30 bar, or between 0.2 bar and 10 bar, or between 0.5 and 5 bar.

16. The process according to claim 1, performed in an installation comprised of at least four outlets, at least five outlets and/or the installation comprises at least four inlets, at least five inlets, or at least six inlets.

17. The process according to claim 1, wherein the at least one mixing unit comprises at least two inlets being liquid inlets, or at least three liquid inlets, or at least four liquid inlets.

18. The process according to claim 16, wherein the installation further includes at least one control unit regulating the filling level of the at least one mixing unit, pump speed, pH, conductivity, calcium ion concentration optionally by ion sensitive electrode, and/or temperature.

19. The process according to claim 16, wherein the installation further includes at least one pump located between the at least one mixing unit and the at least one membrane filtration unit.

20. The process according to claim 16, wherein the installation further includes at least one pump located between the at least one mixing unit and the at least one dividing unit.

21. The process according to claim 20, wherein the pumping capacity of the at least one pump (in $m^3/h$ of the sum) feeding the at least one membrane filtration unit is 0.01 to 100 times the volume of the at least one mixing unit and/or the ratio of the pumping capacity of the at least one pump (in $m^3/h$ of the sum) feeding the at least one dividing unit to the pumping capacity of the at least one pump (in $m^3/h$ of the sum) feeding the at least membrane filtration unit is between 1:1 and 1:1000, or between 1:5 and 1:250.

22. The process according to claim 1, wherein the $CO_2$ gas is introduced between the at least one mixing unit and the at least one dividing unit, or between a feed pump of the at least one dividing unit and the at least one dividing unit, or at the inlet of the dividing unit.

23. The process according to claim 1, wherein a the $CO_2$ gas is introduced through a venturi injector that is located between the at least one mixing unit and the at least one dividing unit, or is located between the outlet of the at least one mixing unit and the inlet of the at least one dividing unit.

24. The process according to claim 2, wherein the $CO_2$ gas is introduced at a top of a hollow shaft of a stirring device of the at least one mixing unit.

25. A process for the purification of minerals, pigments or fillers, the process comprising purifying the minerals, pigments or fillers by:
  a) introducing said minerals, pigments or fillers to at least one mixing unit to form a suspension and heating said suspension using a heating device to between 5° C. and 90° C.,
  b) providing said mixing unit with at least one integral dividing unit comprising dividing means and operating said dividing unit to reduce a size of at least a portion of the minerals, pigments or fillers in the suspension,
  c) introducing at least a portion of the suspension to at least one membrane filtration unit and returning a portion of the suspension to the at least one mixing unit, and
  d) introducing $CO_2$ to the suspension.

26. The process of claim 25, wherein alkali earth carbonate is purified.

27. The process of claim 26, wherein the dividing unit comprises a stirring device.

28. The process of claim 27, wherein the $CO_2$ is introduced at a top of a hollow shaft of the stirring device.

29. The process of claim 25, wherein a portion of the suspension that passes through a filter of the membrane filtration unit is removed from an installation comprised of the mixing unit, dividing unit and membrane filtration unit.

* * * * *